(12) United States Patent
Tang et al.

(10) Patent No.: US 10,810,248 B2
(45) Date of Patent: Oct. 20, 2020

(54) UPGRADING A DATABASE FROM A FIRST VERSION TO A SECOND VERSION

(71) Applicant: salesforce.com, inc., San Francisco, CA (US)

(72) Inventors: Xiaoyi Tang, Petaluma, CA (US); Chaoqun Liu, San Francisco, CA (US); Prashasthi Prabhakar, San Bruno, CA (US); Serge Rielau, Alamo, CA (US); Jeff Cohen, Sunnyvale, CA (US); John Galloway, Alameda, CA (US); Mohan Singamshetty, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 221 days.

(21) Appl. No.: 16/140,498

(22) Filed: Sep. 24, 2018

(65) Prior Publication Data

US 2020/0097498 A1 Mar. 26, 2020

(51) Int. Cl.
*G06F 16/41* (2019.01)
*G06F 16/21* (2019.01)
*G06F 11/14* (2006.01)

(52) U.S. Cl.
CPC ........ *G06F 16/41* (2019.01); *G06F 11/1464* (2013.01); *G06F 16/219* (2019.01)

(58) Field of Classification Search
CPC ..... G06F 16/41; G06F 16/219; G06F 11/1464
See application file for complete search history.

(56) References Cited

U.S. PATENT DOCUMENTS

| | | | | |
|---|---|---|---|---|
| 8,862,550 | B1* | 10/2014 | Sherry | G06F 16/2336 707/647 |
| 2015/0363434 | A1* | 12/2015 | Cerasaro | G06F 16/2358 707/616 |
| 2015/0363436 | A1 | 12/2015 | Cerasaro | |
| 2017/0154072 | A1 | 6/2017 | Cerasaro | |
| 2018/0004792 | A1 | 1/2018 | Desai | |
| 2018/0004793 | A1 | 1/2018 | Desai | |
| 2018/0137113 | A1 | 5/2018 | Kurz | |

(Continued)

OTHER PUBLICATIONS

International Search Report and Written Opinion for Application No. PCT/US2019/052614, dated Dec. 11, 2019, 13 pages.

(Continued)

*Primary Examiner* — Loc Tran
(74) *Attorney, Agent, or Firm* — Butzel Long

(57) ABSTRACT

A processor can produce a database catalog for a second version of a database management system of the database. The database catalog can store metadata related to definitions of objects or tables included in the second version of the database. A controller can be caused to be established in memory cells being used for the first version of the database. A copy of the database catalog for the second version of the database management system can be stored in the memory cells being used for the first version of the database. The controller, using the copy of the database catalog, can produce the second version of the database management system. The second version of the database management system can be caused to interact with data stored in a storage of the database. The storage can be included in the memory cells being used for the first version of the database.

20 Claims, 32 Drawing Sheets

(56) References Cited

U.S. PATENT DOCUMENTS

2018/0203894 A1 7/2018 Cerasaro

OTHER PUBLICATIONS

Rouse, What is binary tree?—Definition from WhatIs.com, URL: https://searchsqlserver.techtarget.com/definiton/binary-tree, retrieved Sep. 19, 2018, 4 pages.
Database—Wikipedia URL: https://en.wikipedia.org/wiki/Database#Storage; retrieved on Sep. 17, 2018, 20 pages.
Database catalog—Wikipedia—https://en.wikipedia.org/wiki/Database_catalog, retrieved on Sep. 21, 2018, 1 pages.
Database normalization—Wikipedia, https://en.wikipedia.org/wiki/Database_normalization, retrieved Sep. 21, 2018, 7 pages.
Information schema—Wikipedia, https://en.wikipediaj.org/wiki/information_schema, retrieved Sep. 21, 2018, 2 pages.
PostgreSQL: Documentation: 9.6: pg_upgrade, https://www.postgresql.org/docs/9.6/static/pgupgrade.html, retrieved Sep. 19, 2018, 7 pages.
Petkovic, Understanding the SQL Server System Catalog, https://logicalread.com/sql-server-system-catalog-mc03#.W6OkaGhKiM8, retrived Sep. 20, 2018, 4 pages.
Updating a DataBase | Database Theory in Practice, retrieved https://dbtips.wordpress.com/2009/07/19/updating-a-database, retrieved on Sep. 19, 2018, 2 pages.

\* cited by examiner

100

Employee Certifications

| EmpID | Name | Certification |
|---|---|---|
| 001 | Anne Alpha | Apple Certified Support Professional - macOS |
| 002 | Brian Bravo | Cisco Certified Technician |
| 003 | Cindy Charles | Oracle Cloud Certification |

Activity Log

| Timestamp | EmpID | Activity |
|---|---|---|
| 20180815 1503 | 002 | troubleshoot network for Delta Co. |
| 20180823 1115 | 001 | update OS for Eddie Echo |
| 20108271342 | 001 | update OS for Felicity Foxtrot |

Database Catalog

Table Name: Employee Certifications
Field Name: EmpID; Data Type: number
Field Name: Name; Data Type: text
Field Name: Certification; Data Type: text Table Name: Activity Log
Field Name: Timestamp; Data Type: date
Field Name: EmpID; Data Type: number
Field Name: Activity; Data Type: text $t_2$  Version 1

Employee Certifications

| EmpID | Name | Certification |
|---|---|---|
| 001 | Anne Alpha | Apple Certified Support Professional - macOS |
| 002 | Brian Bravo | Cisco Certified Technician |
| 003 | Cindy Charles | Oracle Cloud Certification |
| 002 | Brian Bravo | Cisco Certified Architect |
| 003 | Cindy Charles | Oracle Database Certification |
| 001 | Anne Alpha | Apple Certified Support Professional - OS X |

Activity Log

| Timestamp | EmpID | Activity |
|---|---|---|
| 20180815150 3 | 002 | Troubleshoot network for Delta Co. |
| 20180823111 5 | 001 | update OS for Eddie Echo |
| 20180827134 2 | 001 | update OS for Felicity Foxtrot |
| 20180905093 7 | 003 | modify database for Golf Co. |
| 20180912140 8 | 001 | update OS for Henry Hotel |
| 20180920121 0 | 002 | troubleshoot network for India Co. |

Database Catalog

Table Name: Employee Certifications
Field Name: EmpID; Data Type: number
Field Name: Name; Data Type: text
Field Name: Certification; Data Type: text Table Name: Activity Log
Field Name: Timestamp; Data Type: date
Field Name: EmpID; Data Type: number
Field Name: Activity; Data Type: text $t_2$  Version 1

Certifications

| EmpID | CertID | Certification |
|---|---|---|
| 001 | AAA | Apple Certified Support Professional - macOS |
| 002 | AAB | Cisco Certified Technician |
| 003 | AAC | Oracle Cloud Certification |
| 002 | AAD | Cisco Certified Architect |
| 003 | AAE | Oracle Database Certification |
| 001 | AAF | Apple Certified Support Professional - OS X |

Employees

| EmpID | Name |
|---|---|
| 001 | Anne Alpha |
| 002 | Brian Bravo |
| 003 | Cindy Charles |

Database Catalog

Table Name: Certifications
Field Name: EmpID; Data Type: number
Field Name: CertID; Data Type: number
Field Name: Certification; Data Type: text Table Name: Employees
Field Name: EmpID; Data Type: number
Field Name: Name; Data Type: text Table Name: Activity Log
Field Name: Timestamp; Data Type: date
Field Name: EmpID; Data Type: number
Field Name: Activity; Data Type: text

Activity Log

| Timestamp | EmpID | Activity |
|---|---|---|
| 20180815151503 | 002 | troubleshoot network for Delta Co. |
| 20180823115 | 001 | update OS for Eddie Echo |
| 20180827134 | 001 | update OS for Felicity Foxtrot |
| 20180905093 | 003 | modify database for Golf Co. |
| 20190912140 | 001 | update OS for Henry Hotel |
| 20180920121 | 002 | troubleshoot network for India Co. |

$t_3$                Version 2

FIG. 4

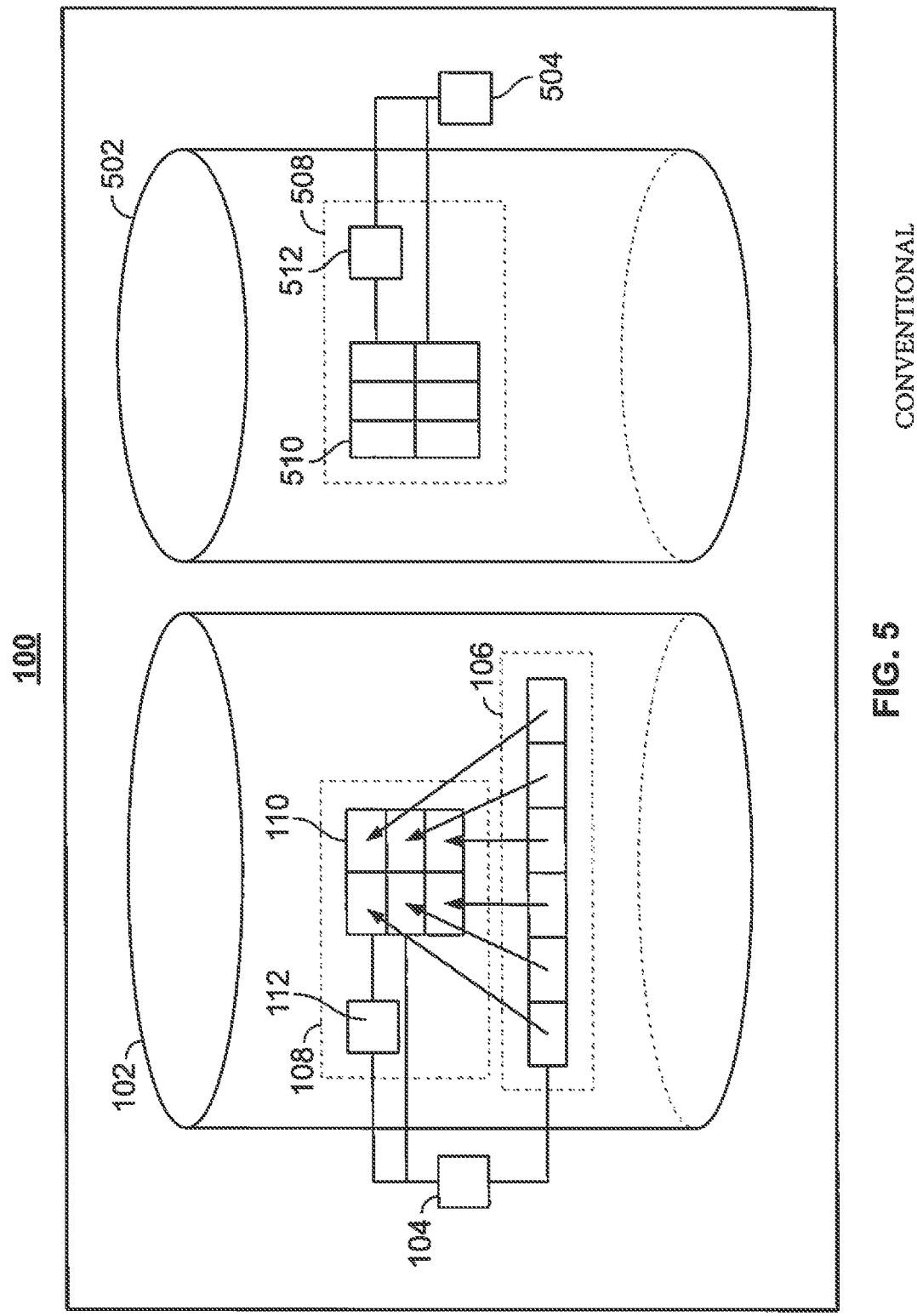
FIG. 5
CONVENTIONAL

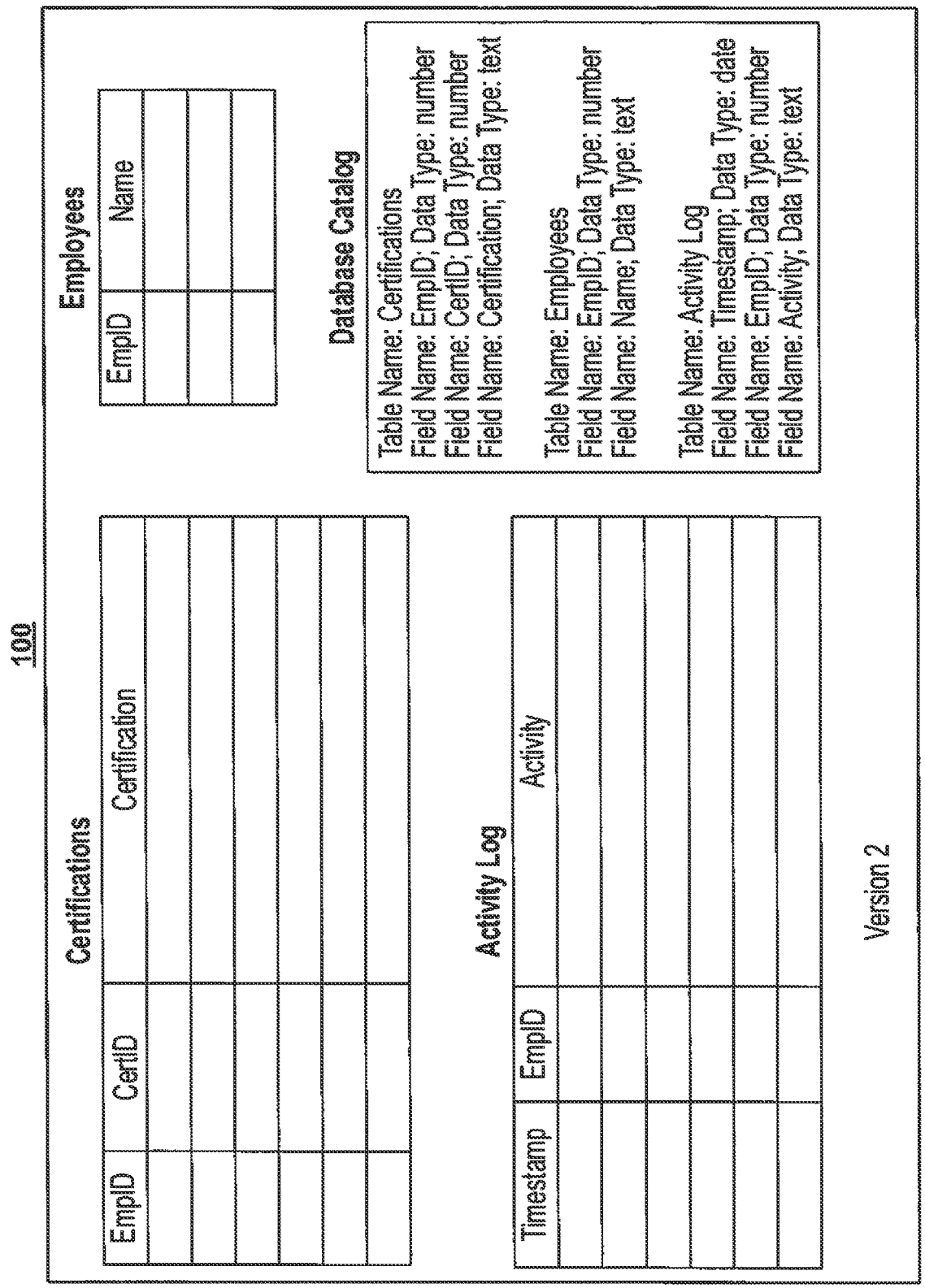
FIG. 6 CONVENTIONAL

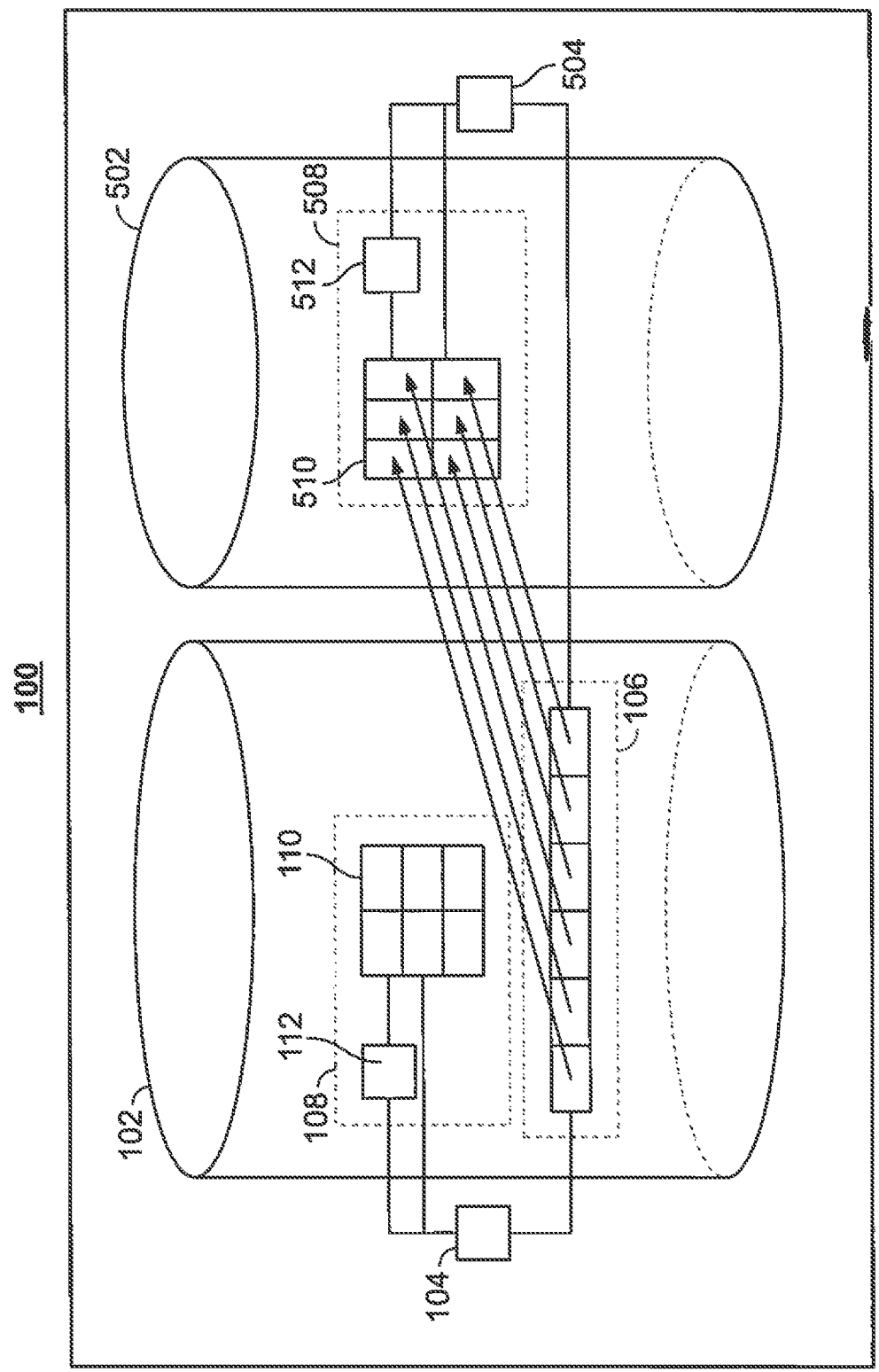
FIG. 7 CONVENTIONAL

1100

1102 — Produce a database catalog for a second version of a database management system

1104 — Cause a controller to be established in memory cells being used for a first version of a database

1106 — Store a copy of the database catalog for the second version of the database management system in the memory cells being used for the first version of the database

1108 — Produce, by the controller and using the copy of the database catalog, the second version of the database management system

1110 — Cause the second version of the database management system to interact with data stored in a storage of the databae

1112 — Cease operations of the first version of the database

FIG. 11

How to find pg_class itself?
Relmapper file

| Objectid | relfilenode | Access method |
|---|---|---|
| pg_class (1259) | 1259 | LSM (8080) |
| pg_attribute (1249) | 1249 | LSM (8080) |
| pg_type (1247) | 1247 | LSM (8080) |
| pg_proc (1255) | 1255 | LSM (8080) |
| Their indexes | ... | ... |

Live under pgdata
- One file for each database
- One file for global tables

FIG. 20

Sample Data in pg_catalog.pg_class

| oid | schema_name | relation_name | refilenode |
|---|---|---|---|
| 1259 | pg_catalog | pg_class | 0 |
| 2600 | pg_catalog | pg_aggregate | 2600 |
| 66666 | core | report | 734434 |
| 77777 | sdb_shadow_catalog | pg_class | 76543210 |
| 77778 | sdb_shadow_catalog | pg_aggregate | 27223833 |
| 88888 | sdb_obsolete_catalog | pg_class | 12345678 |
| 88889 | sdb_obsolete_catalog | pg_aggregate | 21902348 |

FIG. 26

UPGRADING A DATABASE FROM A FIRST VERSION TO A SECOND VERSION

BACKGROUND

A database can be an organized collection of data that can be stored in memory cells (i.e., a storage) and that can be accessed through memory control circuitry controlled by a processor. A database management system can be software that can be operated by the processor so that applications and end users can interact with the memory cells of the database. The database management system can also be stored in the memory cells of the database. The database management system can be configured so that the data stored in the storage can mimic, in interactions with the applications and the end users, being organized into one or more tables. A table can be a collection of data in which a set of one or more specific types of data related to one or more entities can be arranged. A specific type of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 2 is a diagram illustrating an example of a state of a first version of the database at a time $t_1$.

FIG. 3 is a diagram illustrating an example of a state of the first version of the database at a time $t_2$.

FIG. 4 is a diagram illustrating an example of a state of a second version of the database at a time $t_3$.

FIG. 5 is a diagram illustrating an example of a portion of conventional operations to upgrade the database to the second version.

FIG. 6 is a diagram illustrating an example of a second version of a database management system.

FIG. 7 is a diagram illustrating an example of another portion of the conventional operations to upgrade the database to the second version.

FIG. 11 is a flow diagram illustrating an example of a method for upgrading a database from a first version to a second version, according to the disclosed technologies.

FIG. 20 is a diagram illustrating an example of a Relmapper file.

FIG. 23 is a diagram illustrating an example of sample data in pg_catalog.pg_class.

FIG. 25 is a diagram illustrating an example of sample data in pg_catalog.pg_class after copy to a shadow catalog.

FIG. 26 is a diagram illustrating an example of a Relfilenode swap.

DETAILED DESCRIPTION

Figure 1:
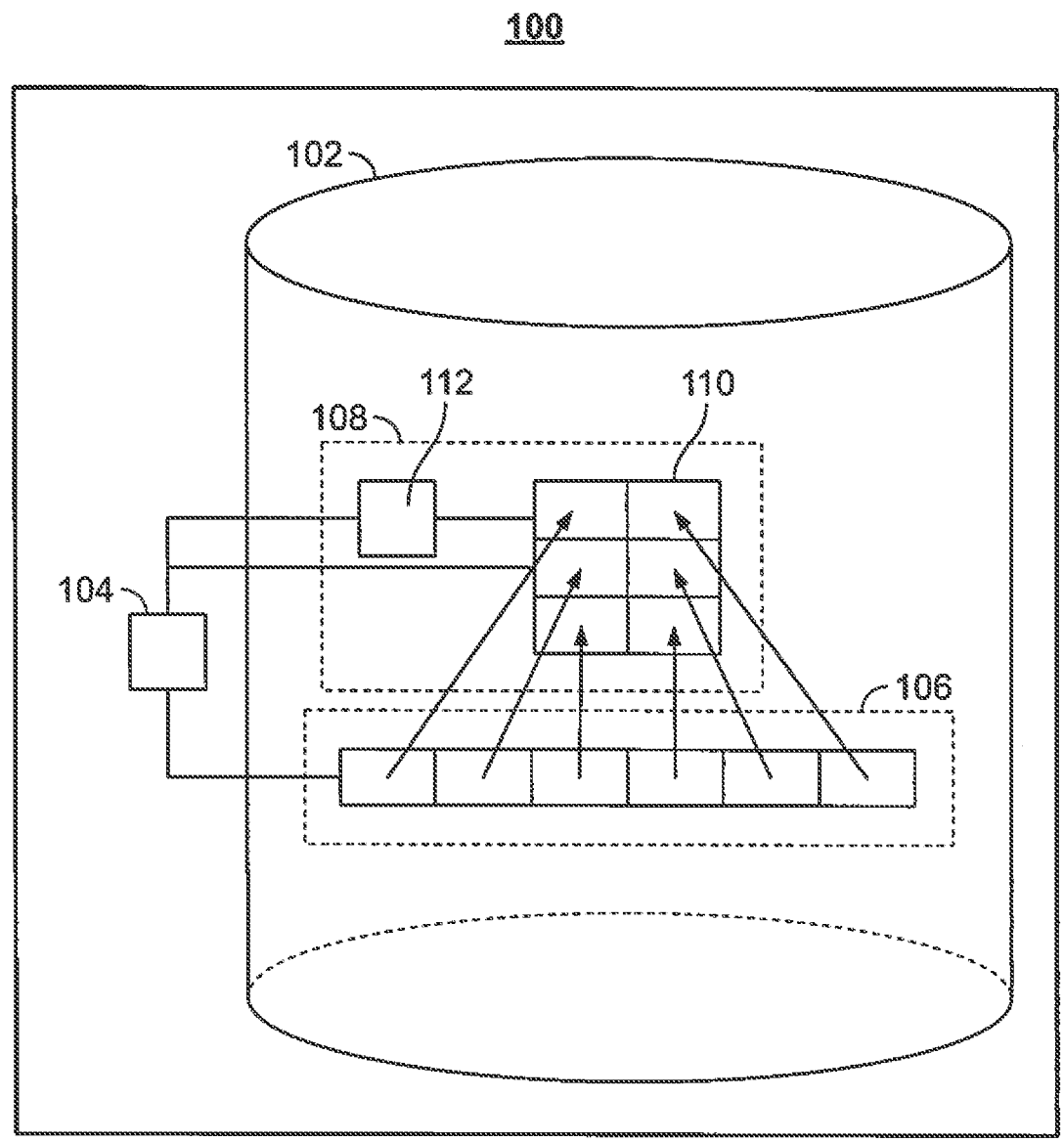
FIG. 1 is a diagram illustrating an example of a database.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A database can be an organized collection of data that can be stored in memory cells (i.e., a storage) and that can be accessed through memory control circuitry controlled by a processor. (The memory cells can be, for example, within a disk drive.) A database management system can be software that can be operated by the processor so that applications and end users can interact with the memory cells of the database.

The database management system can also be stored in the memory cells of the database. The database management system can be configured so that the data stored in the storage can mimic, in interactions with the applications and the end users, being organized into one or more tables. A table can be a collection of data in which a set of one or more specific types of data related to one or more entities can be arranged. A specific type of data can be represented as a field (i.e., a column) in the table. An entity can be represented as a record (i.e., a row) in the table. The database management system can be configured to: (1) create a record to store data for an entity, (2) write data to one or more fields of a record, (3) read data from one or more fields of a record, and (4) delete a record.

Efficient use of the memory cells can be an important aspect in a design of the database. The design of tables can be arranged to avoid a situation in which some of the memory cells are designated to store data for a specific item in a field of an ill-designed table, but only a few records include data for that specific item. Rather than storing such data in the ill-designed table, a first table and a second table can be used. The first table can store the data for the specific item relevant to only the few records and the second table can store data for remaining specific items. A relation can be established between the first table and the second table so that the data for the specific item relevant to only the few records can be read from the database. The metadata can include an entry for each table in the database. Each entry can include a name of the table and, for each field included in the table, a name of the field and a type of data stored in the field.

The design of the tables can also be arranged to avoid a situation in which data for a specific item are duplicatively stored in the memory cells of an ill-designed table. Rather than storing such data in the ill-designed table, again a first table and a second table can be used. The first table can be configured to store only a single instance of the data and the second table can store data for remaining specific items. Again, a relation can be established between the first table and the second table.

Although such an approach to the design of the tables can result in an efficient use of the memory cells, the approach can also result in a large number of tables and relations among these large number of tables. Accordingly, the database can include a database catalog, which can store metadata related to definitions of the tables included in the database. The metadata can include, for example, an entry for each table in the database. Each entry can include, for example, a name of the table and, for each field included in the table, a name of the field and a type of data stored in the field.

FIG. 1 is a diagram illustrating an example of a database 100. The database 100 can include memory cells 102 and a processor 104. The memory cells 102 can include a storage 106 and can store a database management system 108. The database management system 108 can include one or more tables 110 and a database catalog 112.

In a configuration, the memory cells 102 can be within a multi-tenant database. For example, the multi-tenant database can include a first set of the memory cells 102 and a second set of the memory cells 102. The first set and the second set can be disjoint. The first set can be configured to store a first set of records. The second set can be configured to store a second set of records. Fields of the first set of records can have corresponding fields of the second set of records. A field of the fields of the first set of records can be a custom field. A corresponding field of the corresponding fields of the second set of records can be a corresponding custom field. The custom field of the first set of records can be designated to store a first type of data and the corresponding custom field of the second set of records can be designated to store a second type of data.

FIG. 2 is a diagram illustrating an example of a state of a first version of the database 100 at a time $t_1$. For illustrative purposes herein, the database 100 can be for a small information technology support services company. The database 100 can include, at the time $t_1$, a table for "Employee Certifications," a table for an "Activity Log" (e.g., the one or more tables 110 illustrated in FIG. 1), and a "Database Catalog" (e.g., the database catalog 112 illustrated in FIG. 1).

The table for "Employee Certifications" can include three fields and, at the time $t_1$, three records. The fields can include "EmpID" (employee identification), "Name," and "Certification." The three records can include, at the time $t_1$: (1) a record for Anne Alpha, who has employee identification 001 and is an "Apple Certified Support Professional—macOS," (2) a record for Brian Bravo, who has employee identification 002 and is a "Cisco Certified Technician," and (3) a record for Cindy Charles, who has employee identification 003 and has an "Oracle Cloud Certification."

The table for the "Activity Log" can include three fields and, at the time $t_1$, three records. The fields can include a "Timestamp," "EmpID," and "Activity." The three records can include, at the time $t_1$: (1) a record for work done by EmpID 002 to troubleshoot the network for Delta Company on Aug. 15, 2018, at 3:03 pm (timestamp 201808151503), (2) a record for work done by EmpID 001 to update the operating system for Eddie Echo on Aug. 23, 2108, at 11:15 am (timestamp 201808231115), and (3) a record for work done by EmpID 001 to update the operating system for Felicity Foxtrot on Aug. 27, 2018, at 1:42 pm (timestamp 201808271342).

As illustrated in FIG. 2, the "EmpID" field can establish a relation between the table for "Employee Certifications" and the table for the "Activity Log." Through the relation, a query to the database 100 can determine that: (1) Brian Bravo, who is a "Cisco Certified Technician," performed the work to troubleshoot the network for Delta Company and (2) Anne Alpha, who is an "Apple Certified Support Professional—macOS," performed the work to update the operating systems for Eddie Echo and Felicity Foxtrot.

The "Database Catalog" can store metadata related to definitions of the table for "Employee Certifications" and the table for the "Activity Log." For the table for "Employee Certifications," the metadata can include "Table Name: Employee Certifications," "Field Name: EmpID; Data Type: number," "Field Name: Name; Data Type: text," and "Field Name: Certification; Data Type: text." For the table for the "Activity Log," the metadata can include "Table Name: Activity Log," "Field Name: Timestamp; Data Type: date," "Field Name: EmpID; Data Type: number," and "Field Name: Activity; Data Type: text."

As data are added to a database, a design of tables that, at an earlier time, resulted in an efficient use of the memory cells can, at a later time, result in an inefficient use of the memory cells. FIG. 3 is a diagram illustrating an example of a state of the first version of the database 100 at a time $t_2$.

The table for "Employee Certifications" can include, at the time $t_2$, three new records which were added since the time $t_1$: (4) a record for Brian Bravo, who has employee identification 002 and is now also a "Cisco Certified Architect," (5) a record for Cindy Charles, who has employee identification 003 and now also has an "Oracle Database Certification," and (6) a record for Anne Alpha, who has employee identification 001 and is now also an "Apple Certified Support Professional—OS X."

The table for the "Activity Log" can include, at the time $t_2$, three new records which were added since the time $t_1$: (4) a record for work done by EmpID 003 to modify a database for Golf Company on Sep. 5, 2018, at 9:37 am (timestamp 201809050937), (5) a record for work done by EmpID 001 to update the operating system for Henry Hotel on Sep. 12, 2018, at 2:08 pm (timestamp 201809121408), and (6) a record for work done by EmpID 002 to troubleshoot the network for India Company on Sep. 20, 2018, at 12:10 pm (timestamp 201809201210).

As illustrated in FIG. 2, the design of the table for "Employee Certifications" that, at the time $t_1$, resulted in an efficient use of the memory cells has, at the time $t_2$, resulted in an inefficient use of the memory cells. In the table for "Employee Certifications," at the time $t_2$, data for the "Name" field are duplicatively stored. That is, at the time $t_1$, storing the data for a name of an employee that has a specific certification in the "Name" field of the table for "Employee Certifications" resulted in an efficient use of the memory cells because, at the time $t_1$, each employee had only one specific certification. However, because, at the time $t_2$, one or more employees has one or more specific certifications, storing the data for a name of an employee that has a specific certification in the "Name" field of the table for "Employee Certifications" has resulted in an inefficient use of the memory cells. So that the database 100 can again be configured for efficient use of the memory cells, the design of the tables can be rearranged for a second version of the database 100.

FIG. 4 is a diagram illustrating an example of a state of the second version of the database 100 at a time $t_3$. The database 100 can include, at the time $t_3$, a table for "Certifications," a table for "Employees," the table for the "Activity Log," and the "Database Catalog."

The table for "Certifications" can include three fields and, at the time $t_3$, six records. The fields can include "EmpID" (employee identification), "CertID" (certification identification), and "Certification." The "CertID" field can include: (1) certification identification AAA for the "Apple Certified Support Professional—macOS," (2) certification identification AAB for the "Cisco Certified Technician," (3) certification identification AAC for the "Oracle Cloud Certification," (4) certification identification AAD for the "Cisco Certified Architect," (5) certification identification AAE for the "Oracle Database Certification," and (6) certification identification AAF for the "Apple Certified Support Professional—OS X." These correspond to the six records included in the table for "Employee Certifications" in the first version of the database 100 at the time $t_2$.

The table for "Employees" can include two fields and, at the time $t_3$, three records. The fields can include "EmpID" and "Name." The three records can include, at the time $t_3$: (1) a record for Anne Alpha, (2) a record for Brian Bravo, and (3) a record for Cindy Charles.

The table for the "Activity Log" in the second version of the database 100 at the time $t_3$ can be identical to the table for the "Activity Log" in the first version of the database 100 at the time $t_2$.

As illustrated in FIG. 3, the "EmpID" field can establish relations among the table for "Certifications," the table for the "Employees," and the table for the "Activity Log." Through the relations, a query to the database 100 can determine that: (1) Brian Bravo, who is a "Cisco Certified Technician" and a "Cisco Certified Architect," performed the work to troubleshoot the networks for Delta Company and India Company, (2) Anne Alpha, who is an "Apple Certified Support Professional—macOS" and an "Apple Certified Support Professional—OS X," performed the work to update the operating systems for Eddie Echo, Felicity Foxtrot, and Henry Hotel, and (3) Cindy Charles, who has an "Oracle Cloud Certification" and an "Oracle Database Certification," performed the work to modify the database for Golf Company.

The "Database Catalog" can store metadata related to definitions of the table for "Certifications," the table for "Employees," and the table for the "Activity Log." For the table for "Certifications," the metadata can include "Table Name: Certifications," "Field Name: EmpID; Data Type: number," "Field Name: CertID; Data Type: text," and "Field Name: Certification; Data Type: text." For the table for "Employees," the metadata can include "Table Name: Employees," "Field Name: EmpID; Data Type: number," and "Field Name: Name; Data Type: text." For the table for the "Activity Log," the metadata can include "Table Name: Activity Log," "Field Name: Timestamp; Data Type: date," "Field Name: EmpID; Data Type: number," and "Field Name: Activity; Data Type: text."

The disclosed technologies can be directed to operations to upgrade a database from a first version to a second version.

Conventionally, operations to upgrade a database from a first version to a second version have required: (1) providing another processor and other memory cells to design a second version of the database management system, (2) causing the second version of the database management system to interact with the data stored in the storage, and (3) ceasing operations of a first version of the database management system. This approach requires a relatively large number of the other memory cells to be available to store the second version of the database management system and the other processor to be available to operate the second version of the database management system.

FIG. 5 is a diagram illustrating an example of a portion of conventional operations to upgrade the database 100 to the second version. The database 100 can include the memory cells 102 and the processor 104. The memory cells 102 can include the storage 106 and can store the database management system 108. The database management system 108 can include the one or more tables 110 and the database catalog 112. Additionally, the database 100 can include another processor 504 and other memory cells 502 to design the second version of the database management system 508. The second version of the database management system 508 can include one or more other tables 510 (e.g., the table for "Certifications," the table for "Employees," and the table for the "Activity Log" illustrated in FIG. 4) and another database catalog 512 (e.g., the "Database Catalog" illustrated in FIG. 4). FIG. 6 is a diagram illustrating an example of the second version of the database management system 508.

FIG. 7 is a diagram illustrating an example of another portion of the conventional operations to upgrade the database 100 to the second version. As illustrated in FIG. 7, the second version of the database management system 508 has been caused to interact with the data stored in the storage 106 to produce the second version of the database 100 illustrated in FIG. 4. The database illustrated in FIG. 7 has a shared storage.

In contrast, rather than: (1) providing another processor and other memory cells to design the second version of the database management system and (2) causing the second version of the database management system to interact with the data stored in the storage, the disclosed technologies can: (1) provide another processor and other memory cells to produce a database catalog for the second version of the database management system, (2) establish a second version controller in the memory cells of the first version of the database, (3) store a copy of the database catalog for the second version of the database management system in the memory cells of the first version of the database, (4) cause the second version controller to use the copy of the database catalog for the second version of the database management system to produce one or more other tables of the second version of the database management system, (5) cause the second version of the database management system to interact with the data stored in the storage, and (6) cease the operations of the first version of the database management system.

In comparison with the conventional approach described above, the approach of the disclosed technologies requires: (1) a smaller number of the other memory cells to be available to store the database catalog for the second version of the database management system (rather than the second version of the database management system as a whole) and (2) fewer operations to be performed by the other processor to produce the database catalog for the second version of the database management system (e.g., as compared with the other processor of the conventional approach, the other processor of the disclosed technologies can be a lightweight processor). Additionally, in a configuration, the operations of the disclosed technologies can be performed gradually so that: (1) disruptions of services provided to users by the database can be for only for a nominal duration of time (e.g., 30 seconds) and (2) upgrading the database from the first version to the second version can be performed effectively in a manner that can by imperceptible by users of the database.

Figure 8:
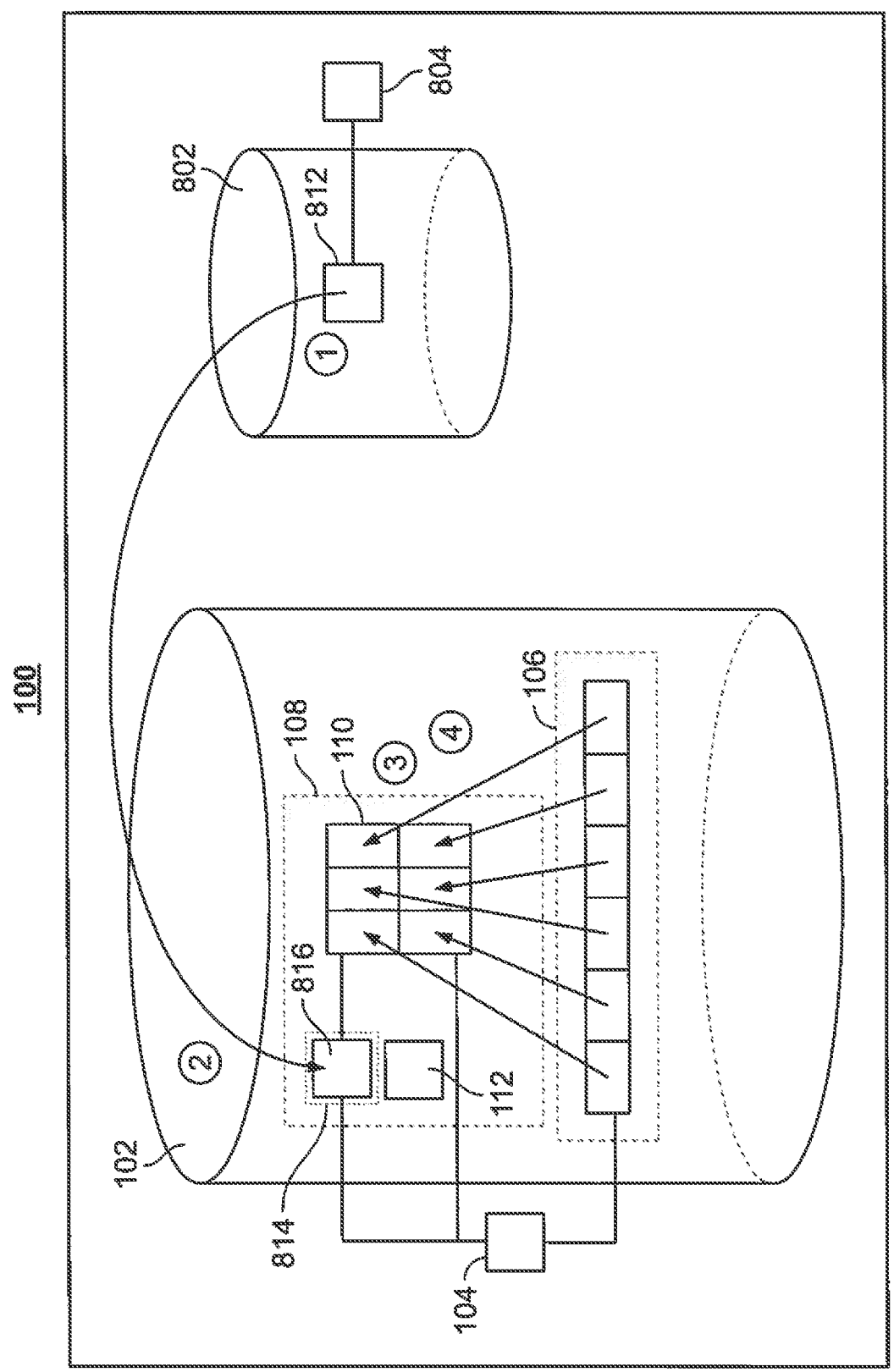
FIG. 8 is a diagram illustrating an example of operations to upgrade the database to the second version according to the disclosed technologies.
Figure 9:
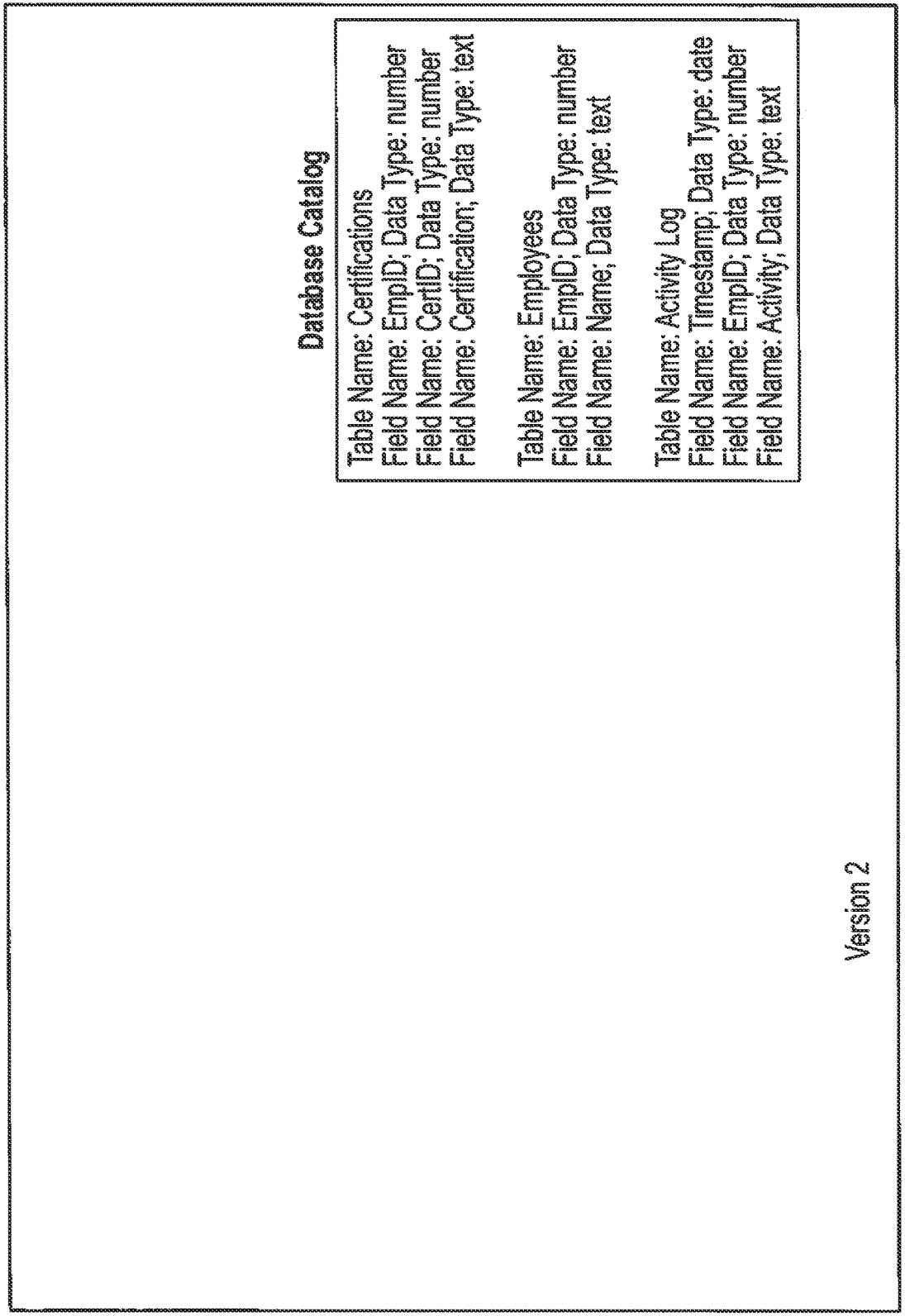
FIG. 9 is a diagram illustrating an example of a copy of a database catalog for the second version of the database management system stored in memory cells being used for the first version of the database.
Figure 10:
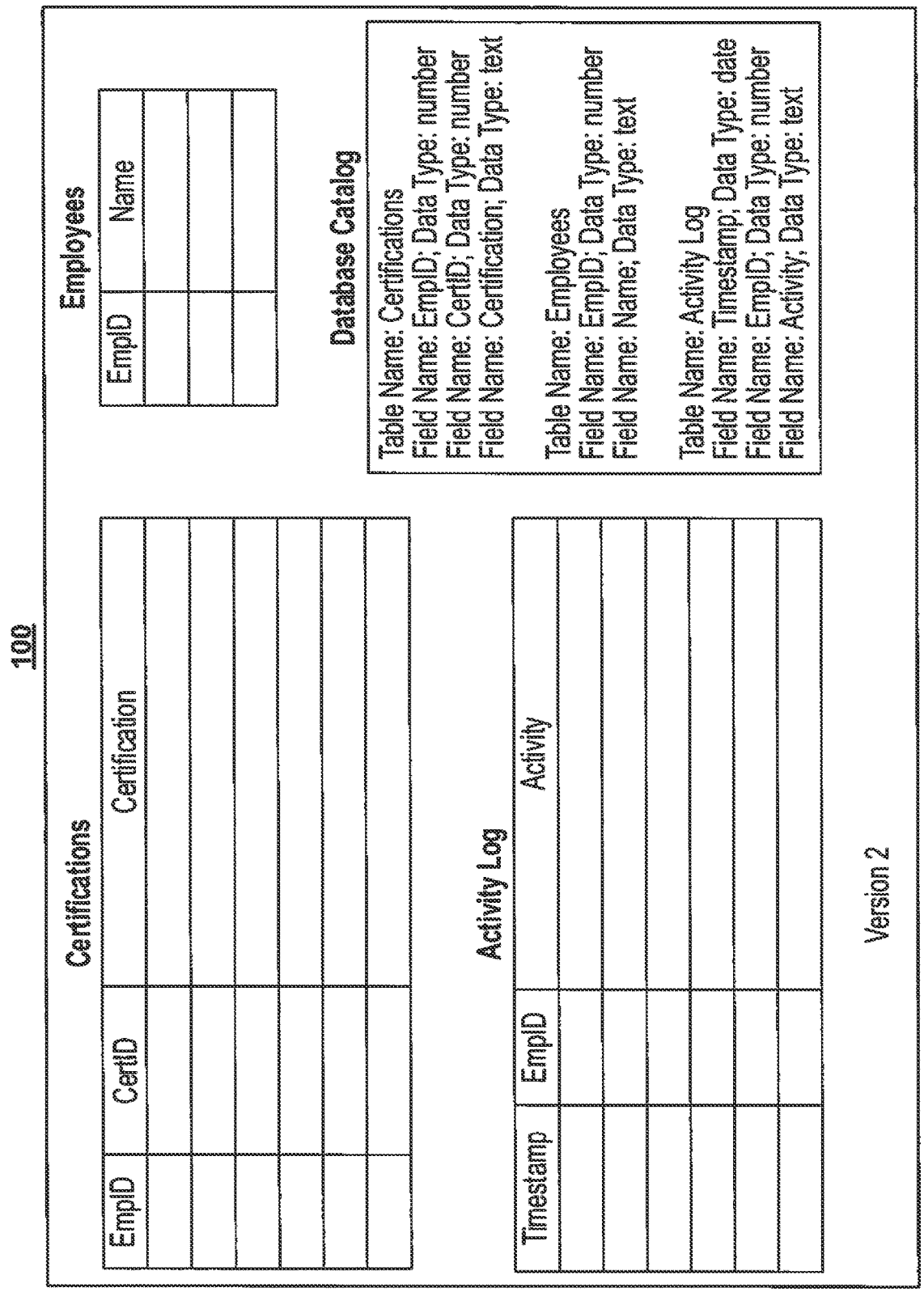
FIG. 10 is a diagram illustrating the second version of the database management system stored in the memory cells being used for the first version of the database.

FIG. 8 is a diagram illustrating an example of operations to upgrade the database 100 to the second version according to the disclosed technologies. The database 100 can include the memory cells 102 and the processor 104. The memory cells 102 can include the storage 106 and can store the database management system 108. The database management system 108 can include the one or more tables 110 and the database catalog 112. Additionally, the database 100 can include another processor 804 and other memory cells 802 to be produce the database catalog for the second version of the database management system 812 (e.g., the "Database Catalog" illustrated in FIG. 4) as illustrated as an operation 1 in FIG. 8. The second version controller 814 can be established in the memory cells 102 being used for the first version of the database 100 and a copy 816 of the database catalog for the second version of the database management system can be stored in the memory cells 102 being used for the first version of the database 100 as illustrated as an operation 2 in FIG. 8. FIG. 9 is a diagram illustrating an example of the copy 816 of the database catalog for the second version of the database management system stored in the memory cells 102 being used for the first version of the database 100. Returning to FIG. 8, the second version controller 814 can be caused to use the copy 816 of the database catalog for the second version of the database management system to produce the one or more other tables of the second version of the database management system (e.g., the table for "Certifications," the table for "Employees," and the table for the "Activity Log" as illustrated in FIG. 4) as illustrated as an operation 3 in FIG. 8. FIG. 10 is a diagram illustrating the second version of the database management system stored in the memory cells 102 being used for the first version of the database 100. Returning to FIG. 8, the second version of the database management system can be caused to interact with the data stored in the storage 106 to produce the second version of the database 100 (as illustrated in FIG. 4) as illustrated as an operation 4 in FIG. 8.

FIG. 11 is a flow diagram illustrating an example of a method 1100 for upgrading a database from a first version to a second version, according to the disclosed technologies. In the method 1110, at an operation 1102, a first processor can produce a database catalog for a second version of a database management system of the database. The database catalog can be configured to store metadata related to definitions of objects or tables included in the second version of the database. The metadata related to the definitions of the objects or the tables included in the second version of the database can include, for example, an entry for each of the objects or the tables in the second version of the database. Each entry can include, for example: (1) a name of a table or an object and (2) for each field included in the table or for each attribute included in the object: (a) a name of a field or an attribute and (b) a type of data stored in the field or the attribute.

At an operation 1104, a controller can be caused to be established in memory cells being used for the first version of the database. A number of memory cells used to produce the database catalog for the second version of the database management system can be, for example, less than a number of the memory cells being used for the first version of the database.

At an operation 1106, a copy of the database catalog for the second version of the database management system can be stored in the memory cells for the first version of the database.

At an operation 1108, the second version of the database management system can be produced by the controller using the copy of the database catalog, the second version of the database management system. The controller can be configured, for example, only to produce the second version of the database management system. The controller can be configured, for example, not to produce another version of the database management system.

At an operation 1110, the second version of the database management system to can be caused to interact with data stored in a storage of the database. The storage can be included in the memory cells being used for the first version of the database. A second processor can be configured, for example, to interact with the memory cells being used for the first version of the database to operate the first version of the database. The first processor can be different from the second processor. A processing speed of the first processor can be, for example, less than a processing speed of the second processor. In a configuration, the operation 1110 can be performed on a portion of the data stored in the storage of the database in response to a request to access the portion of the data. In this manner, the upgrading the database can occur gradually over time as portions of the data stored in the storage of the database are, in turn, subject to requests for access. The upgrading the database can be performed in a manner that is imperceptible to a user of the database.

At an optional operation 1112, operations of the first version of the database can cease.

In a configuration, a duration of time of an instance in which, during the upgrading the database, the database is unresponsive to a request can be a short duration of time. For example, the short duration of time can be less than or equal to thirty seconds.

In a configuration, an upgrade of an application associated with the database can be suspended during the upgrading the database.

In a configuration, the operations 1102, 1104, 1106, 1108, and 1110 can be performed for a first cluster of the database. In this configuration, the operations 1102, 1104, 1106, 1108, and 1110 can be performed for a second cluster of the database. For example, performing the operations 1102, 1104, 1106, 1108, and 1110 for the second cluster of the database can occur after the operations 1102, 1104, 1106, 1108, and 1110 have been performed for the first cluster of the database. The second cluster of the database can include, for example, a standby cluster, a disaster recovery cluster, or a high availability cluster.

According to the disclosed technologies, there can be one database container running per host at any given time. This can maximize utilization of the database hosts.

The disclosed technologies can be general enough to handle the vast majority of future database upgrade scenarios (i.e., upgrade scenarios that require an outage should be years apart).

The disclosed technologies may not increase hardware requirements (i.e., they may not require an extra host).

The disclosed technologies can realize be zero downtime as perceived by the end user. In general this means the database can be unresponsive to requests for at most 30 seconds.

The disclosed technologies can be operationally straight forward.

The disclosed technologies can be configured to provide only one solution for all upgrades in production.

The disclosed technologies can be implemented in a manner in which an upgrade of an application associated with the database can be suspended during an upgrade of the database.

The disclosed technologies can be implemented in a manner so that an in-progress upgrade causes a deterioration of a high availability (HA) or a disaster recovery (DR) service.

The disclosed technologies can be implemented in a manner so that a duration of an upgrade can be predictable and near constant in time. That is, the time may not increase for larger datasets.

The disclosed technologies can be implemented in a manner so that if an upgrade fails for any reason, there can be an easy way to get back to the previous state without loss of customer data and with an overall disruption of less than 30 seconds.

The disclosed technologies can be implemented in a manner that is easy or feasible to test with fault injection in an automated fashion.

The disclosed technologies can build a shadow database catalog that can match an upgraded version before replacing the database container with a newer version. When starting the new database binary, the old catalog can be swapped out for the new catalog.

Using the disclosed technologies, an upgrade a database service cluster from a first version to a second version can include the following operations:

1. Validate prerequisites

This phase can be to minimize the risk of failure throughout the upgrade process. It can include:
   a. Cleanup of leftovers from previous failed upgrades.
   b. Validation that there are sufficient resources available to contain the dumped and copied files.
   c. Confirming that there is no ongoing application upgrade.

2. Building the new catalog

This operation can be performed by a dedicated "upgrade controller container" which can reside in SAM and can be used to connect to the master. The controller can perform the following operations:
   a. Initdb can be done at upgrade container image build time.
   b. Create shadow catalog schema in the database service.
   c. Place the database service cluster into a mode that prevents certain actions (written in Data Definition Language (DDL)).

This can basically place the entire original system catalog into read only mode. This can exclude pg_tenant.
   d. The upgrade controller can perform a dump of the database service's app schema.
   e. The upgrade controller can perform a restore of the database service's dumped app schema into its local database.
   f. The upgrade controller can copy the entire system catalog content to a set of csv files and generates a DDL script for the system catalog tables.
   g. The system catalog csv files can be shipped to the database services master.
   h. The upgrade controller can fill the shadow catalog tables (created in b) with the shipped csv files.
   i. The upgrade controller can mark the database service cluster as "ready for container upgrade."

The "upgrade controller" can execute with a minimal database instance because the only purpose of the controller is to generate a second version system catalog with app schema. Furthermore the controller can entirely operate in memory using a RAM disk and without logging.

This may greatly improve performance of the restore.

The amount of data transferred between the upgrade controller and the database service's master can be kept to a minimal by shipping zip files. Both the dump output and the csv files may compress very well.

By the end of this operation, accounting for latency in the disaster recovery (DR) log record application, the entire database service cluster can have an up to date second version cloned catalog.

2. Performing the binary upgrade.

This operation can to be performed on the disaster recovery (DR) site first and the slaves of the local database service. The master can be upgraded last relying on a high availability (HA) failover to keep the application up. Note that at this time the app can start to operate on the second version database binary.

The individual operations can be:
   a. Replace the first version container with a second version container.
   b. Start the second version of the database.
   c. When the second version of the database starts it will discover that it is the second version and there is a catalog clone at the second version.

It can then flip the catalog to use this clone and can perform minor housekeeping on the bootstrap tables.
   d. Go into continuous recovery mode (i.e., this can always a slave).

3. Remove the no-DDL flag.

Once the last node in the cluster has been upgraded, the certain actions (written in DDL) can be allowed again.

Upgrade Controller Service

The upgrade controller can be a microservice that need not be co-located with the database nodes. It can be conceptually part of the orchestration. The container can include:

a second version instance of the database. (Note that this changes with each version so a new controller may need to be produced with each upgrade (the controller can be just an empty initdb so it is not itself upgraded).)

optionally, a RAM disk big enough to hold the core app schema. Alternatively, a local SSD can be used.

a driver program to execute the upgrade steps

There may be no need for:

a Java virtual machine (JVM), a metric streamer, or a distributed database store.

In a configuration, the container can come with initdb already executed ready to accept the app schema.

Figure 12:
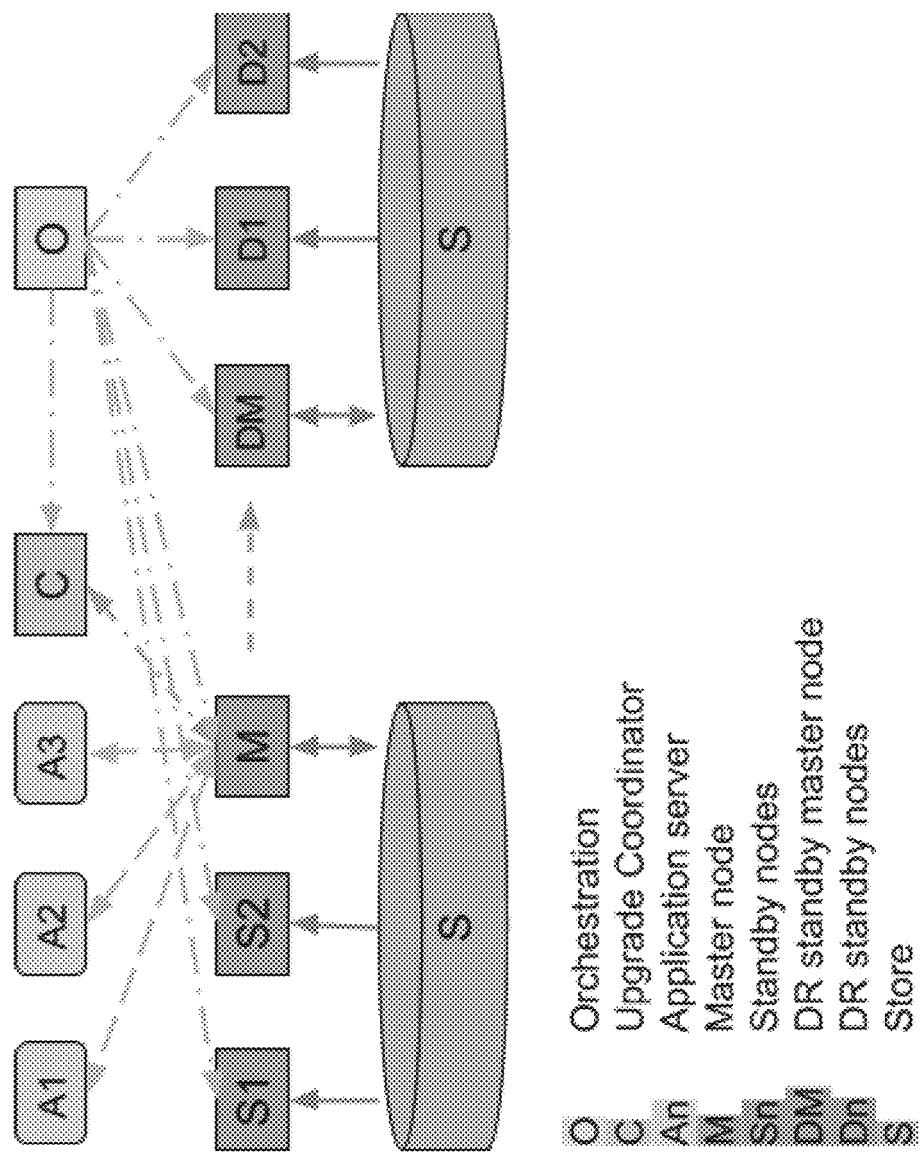
FIG. 12 is a diagram illustrating an example of a topology for upgrading a database from a first version to a second version, according to the disclosed technologies.

FIG. 12 is a diagram illustrating an example of a topology for upgrading a database from a first version to a second version, according to the disclosed technologies.

Figure 13:
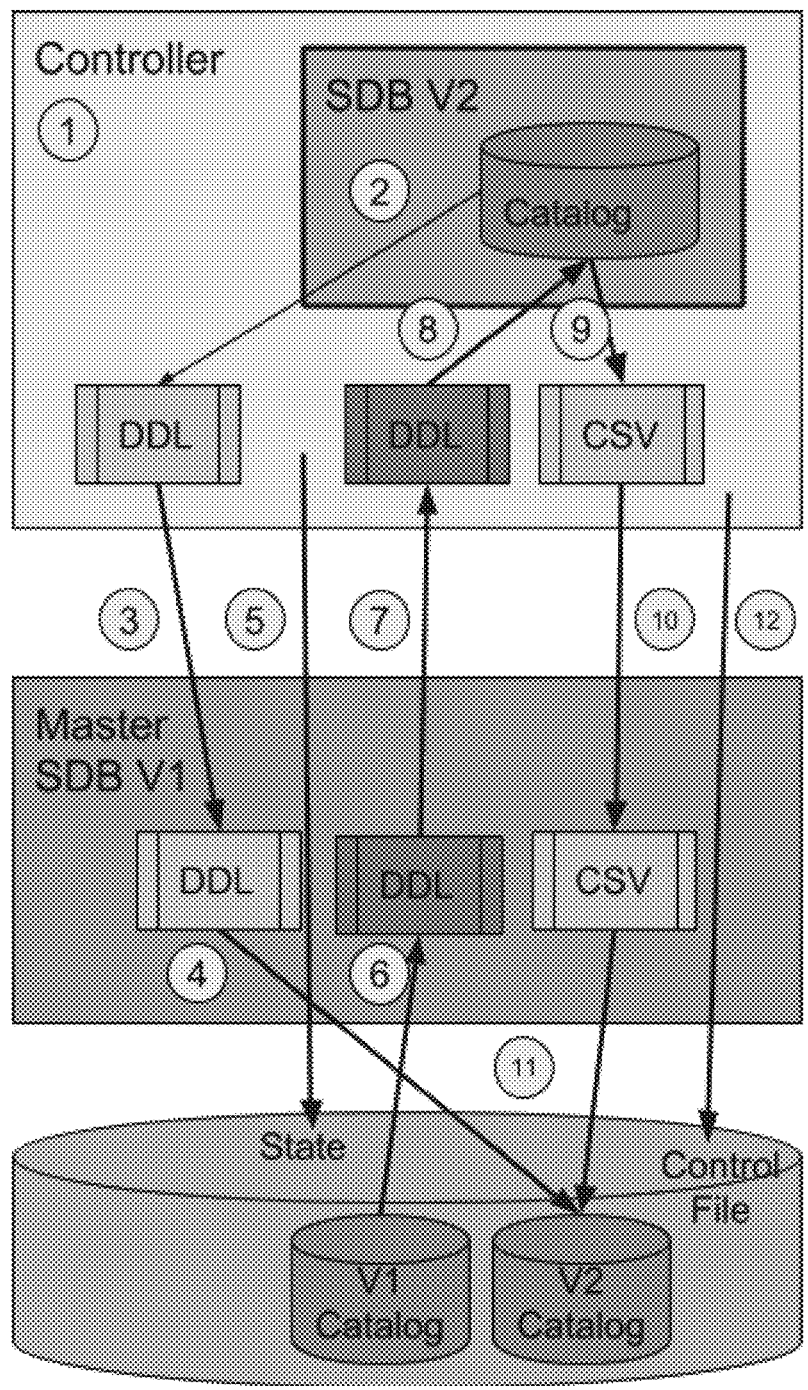
FIG. 13 is a diagram illustrating an example of a method for upgrading a database from a first version to a second version, according to the disclosed technologies.

FIG. 13 is a diagram illustrating an example of a method for upgrading a database from a first version to a second version, according to the disclosed technologies. The following operations are illustrated in FIG. 13:

1. Acquire a second version controller (i.e., a controller for this particular upgrade version)
2. Dump the second version system catalog DDL files (pg_dump of controllers second version catalog after initdb)
3. Push catalog DDL files (pg_dump output from step 2) to master
4. For each database, build a second version shadow catalog in new schema on the first version master. Shared tables can be built only once in template1.
5. Mark no-DDL phase (called from the upgrade scripts on the controller)
    a. This can either stop workflow daemons or they must observe restrict-DDL semantics. But the DR site workflow daemons may continue since they never modify catalog tables.
6. Dump App schema DDL excluding the shadow tables.
7. Pull app schema DDL to controller
8. Restore app schema to the second version catalog (on controller)
9. Copy the second version catalog to comma separated values (CSV) files
10. Ship the CSV files to master
11. Copy the CSV files to the second version shadow catalog
12. Mark the database ready for upgrade
13. Perform kubernetes upgrade on the disaster recovery (DR) site
    a. Wait for the shadow catalog to propagate to the disaster recovery (DR) site
    b. Start the second version slaves (which find and use the shadow catalog)
    c. When all slaves are operating in the second version, flush (to get most of it done), go into superuser-only mode (to stop the App connections), flush (to speed recovery), stop the first version master
14. Perform kubernetes upgrade on the Primary site
    a. Start the second version slaves (which find and use the shadow catalog)
    b. When all slaves are the second version, flush (to get most of it done), go into superuser-only mode (to stop the App connections), flush (to speed recovery), stop the first version master
15. Clear restrict-DDL mode (called by the Orchestrator for successful or failed upgrade)
16. the upgraded database is now ready for use Technical Details There can be two main phases in the database upgrade.

Shadow catalog creation. This phase can hide details of the catalog change so that a next phase of a rolling upgrade can do a binary upgrade. This phase can be handled by an upgrade controller, a lightweight (sdb image only, without bk proxy and metric streamer), short-lived container that can contain the second version of the database image and upgrade script. A single upgrade controller can be needed for each database cluster. After successful completion of this phase, the shadow catalog with the second version shape, builtin, and app schema can be created in the primary. When standbys catch up the shadow catalog change, the cluster can be ready for upgrade. If this phase fails in anyway, no harm is done. All this phase creates is a shadow catalog that can only be used with the second version image. Any artifact left from a previously failed run can be dropped when the upgrade controller runs again. This phase can take about 10 minutes for the core app schema and 2 GB of memory.

Rolling upgrade. This phase is associated with orchestration. The upgrade can occur on a production cluster first and a disaster recovery (DR) cluster last.

Create Shadow Catalog

Upgrade Mode. The database upgrade can require operations not allowed normally, including creating shadow schema and creating tables in pg_global table space. Add a new boolean session scoped Grand Unified Configuration (GUC) upgrade_mode to allow these in the upgrade. The GUC can be set up by a super user only. The upgrade controller can execute a script in a database cluster as a db superuser.

Block certain database actions (written in DDL). Most of the operations may iterate all databases in pg_database. As such, it can be necessary to block certain database actions (written in DDL) once a list of databases to work with has been obtained. The command can be: SELECT pg_catalog.pg_set_restriction mode ('block-db-ddl');

Shadow Schema. Shadow catalog tables can be created under the schema named sdb_shadow_catalog owned by super user. The name can be reserved for use by the database upgrade only. For security, an application cannot create the same schema or modify its contents. This assumes the application cannot connect to the database through a super user. For failure diagnosis, the schema can be visible to release engineers connecting as a super user.

The schema can be created (or dropped first if pre-existing) in each database in the cluster. Template0 does not allow connection by default. It may enable connection during upgrade and disable at the end.

Shadow Catalog Table. Most catalog tables can be specific to a database, e.g., pg_class. Shadow tables for these database can be created like normal user tables.

A small set of catalog tables can be shared by all databases, examples are pg_database, pg_authid, pg_tenant etc. Database number part of log-structured merge (LSM) keys for these table rows are 0. Shadow tables can require a special tweek. Its key must be in the same key space as the real one it will eventually replace. That means the database number may also be 0. A way to do this can be to use pg_global table space in create table DDL. For example, create table sdb_shadow_catalog.pg_database ( . . . ) with oids tablespace pg_global;

Table space is not used in the database. Use of pg_global here can be only to get the right storage key without inventing new grammar.

The DDL to create shadow catalog can be parsed from psql \d table command output. Pg_dump may not work out of the box because the primary key is not properly dumped, and LSM tables require a primary key. This can be because catalog tables do not have primary key constraints defined in pg_constraint table. As a result, the primary key can be dumped as a unique index. pg_dump can be fixed. pg_dump—table=pg_class—schema-only template1

```
CREATE LSM TABLE pg_class (
    relname name NOT NULL,
    relnamespace oid NOT NULL,
    reltype oid NOT NULL,
    reloftype oid NOT NULL,
    relowner oid NOT NULL,
    relam oid NOT NULL,
    relfilenode oid NOT NULL,
    reltablespace oid NOT NULL,
    relpages_deprecated integer NOT NULL,
    reltuples_deprecated real NOT NULL,
    relallvisible integer NOT NULL,
    reltoastrelid oid NOT NULL,
    relhasindex boolean NOT NULL,
    relisshared boolean NOT NULL,
    relpersistence "char" NOT NULL,
    relkind "char" NOT NULL,
    reltenancy "char" NOT NULL,
    relnatts smallint NOT NULL,
    relchecks smallint NOT NULL,
    relhasoids boolean NOT NULL,
    relhaspkey boolean NOT NULL,
    relhasrules boolean NOT NULL,
    relhastriggers boolean NOT NULL,
    relhassubclass boolean NOT NULL,
    relrowsecurity boolean NOT NULL,
    relforcerowsecurity boolean NOT NULL,
    relispopulated boolean NOT NULL,
    relreplident "char" NOT NULL,
    relfrozenxid xid NOT NULL,
    relminmxid xid NOT NULL,
    relacl aclitem[ ],
    reloptions text[ ]
);
CREATE UNIQUE INDEX pg_class ON pg_class USING lsm (oid);
CREATE UNIQUE INDEX pg_class_relname_nsp_index ON
pg_class USING lsm (relname, relnamespace);
CREATE INDEX pg_class_tblspc_relfilenode_index ON
pg_class USING lsm (reltablespace, relfilenode);
``` pg_tenant

Table pg_tenant may not be part of the shadow catalog if its shape does not change because it may block tenant operation unnecessarily. This is one of the advantages that the shadow catalog upgrade has over sdbinstall which requires copying every catalog table. In the rare case that it does change, it can be added to the shadow table. Sdbinstall can separate tenant dumping from other schema dumps to reduce the window of blocking a tenant operation. After other DDL files are copied into shadow schema, the system can block tenant DDL files as well. Pg_tenant can then be copied into shadow schema in the same way.

Alternatively, the disclosed technologies can enforce no change to pg_tenant by predefining N (e.g., 30) text columns to be used in the future, like the custom object in sfdc core. pg_tenant table may never be shadowed. However, there can be complications with this approach when indexes are changed or added. A shadow table can handle index change automatically.

pg_statistic pg_statistic table needs to be shadowed even if its shape doesn't change because its anyarray type columns contain pg_type.oid which is not stable for some types defined in information_schema.sql. See Anyarray for details how to handle pg_statistic.

pg_workflow

Workflow data can be in pg_workflow and pg_workflow_tags. Import to controller can be handled with direct DML statements the same as sdbinstall. Active workflows can also be in storage catalog. Sdbinstall uses sql functions to export and import workflows in the storage catalog. The shadow catalog does not need this operation because it is an in-place upgrade. The storage catalog can be versioned. The second version can be able to read the same storage catalog (with workflows in it) and convert to the latest version.

Workflow can currently be used to create an index and a tenant snapshot. By default, workflow execution can be blocked during upgrade as it may change the system catalog, rendering the shadow catalog invalid. However, it can be important not to block the tenant snapshot during upgrade. The same approach as pg_tenant can be used. Workflow tables may not be shadowed if there is no shape change.

Sequence pg_workflowid and pg_lsmoid are catalog sequences that can be created during initdb time. Their oid/relfilenode may not be stable.

Shadow sequences may need to be created for these as well.

1. Enhance pg_dump to output sequence definitions and current values.
2. Create shadow sequence and set the current values to the same values from dump.
3. Update relfilenode for the sequences just like shadow tables User defined sequences can be used just like user defined tables because relfilenode does not change. However, an important assumption is that the storage format for a sequence must not change (or be backward compatible). A sequence can be stored as a single tuple in log-structured merge (LSM) with several hard-coded attributes storing sequence metadata like start value, increment etc., as well as a last value. If postgres somehow changes the format, it would disrupt this upgrade. This can happens in PG10. In PG10, sequence record format changes significantly (moving some attributes from data record to pg_sequence table). For the upgrade to work, the database can diverge from PG10 by keeping attributes that move to pg_sequence in the data record as dummy values.

No DDL Mode

After the shadow schema is created, the database can enter a no DDL mode. A tenant can still be created, modified, or dropped. The mode may be persistent (pg_database-.datrmode column for template1 row) and block all DDL files (expect create/drop tenant) from app/backends or daemons.

At the same time, workflows can be paused as well to make sure a copy in the shadow is exactly the same as the original.

Schema Dump and Restore pg_dumpall can be used to dump all app schemas, excluding shadow catalog schema. Therefore, when the dump file is loaded into shadow catalog, there may be no shadow catalog information. For example, while pg_catalog.pg_class has a row for sdb_shadow_catalog.pg_class, sdb_shadow_catalog.pg_class does not. As a result, there may be no need to cleanup the shadow catalog metadata after upgrade.

Currently, pg_dumpall does not dump template0, template1, and postgres. That means any customization to these databases may not be carried over after upgrade.

The schema dump from the database core app can be about 180 MB in size and can be compressed to 20 MB before sending to the controller. Tests show that the schema dump can take 50 seconds locally, three minutes if dumping from a different host. It can be better to ssh into master to run the dump command.

The dump file can be replayed in the controller by psql.

Copy Catalog Data

Next, copy the catalog table data from the second version controller to the shadow catalog in a database cluster still on operating in the first version for every database using copy command. Oids can be maintained if the table has it so that FK references stay valid.

On controller copy pg_class to "<filepath>" with oids;

On master copy sdb_shadow_catalog.pg_class from "<filepath>" with oids;

The disclosed technologies can make sure that the text or binary data generated from the second version in "copy to" can be read correctly in the first version in "copy from". <adt>in and <adt>out functions that convert between internal and external formats must match across releases. Document for copy command indicate backward compatibility for binary output format. The disclosed technologies can require forward compatibility as a reader (master) is on an older version. Text format can be used. This can be a risky area that needs good testing, especially for complex data types like anyarray, pg_node_tree, aclitem. One simple test can be to compare the second version copy output with the first version copy output.

List of unique column data types in pg_catalog tables.

```
postgres=# select distinct atttypid::regtype from pg_attribute a ,
pg_class c where a.attrelid = c.oid and
c.relnamespace='pg_catalog'::regnamespace and c.relkind='r';
    atttypid
    ------------------------
    text
    oid
    "char"
    pg_node_tree
    timestamp with time zone
    aclitem[ ]
    boolean
    anyarray
    oid[ ]
    gkey
    int2vector
    regproc
    smallint[ ]
    xid
    bytea
    "char"[ ]
    real[ ]
    oidvector
    real
    name
    cid
    smallint
    integer
    bigint
    text[ ]
(25 rows)
    Anyarray
```

Any array type used in pg_statistic can be tricky. As it can be any type, the text output has a pg_type oid to identify type followed by array values. However, pg_type oid may not be stable across releases for types without oid specified, e.g., types defined in information_schema.sql.

From the source to the controller, the same functions can be used by current sdbinstall to dump and load. These can be pg_load_column***functions. Copy anyattray data from the controller and into shadow pg_statistic can need to treat the data as blob and may not need any special formatting and validation. Current behavior can validate the data. It may not work because of type id mismatch.

The solution may be not to format anyarray data to text by default. Instead, a new Grand Unified Configuration (GUC) can be used to control its output format. For upgrade, the data can be base64 encoded. A copy to a table can then base64 decode it.

Array

There can be several array types in pg_catalog. One such array can be aclitem[ ]. Copy in/out for aclitem had a problem in PG10. aclitem can be related to users in pg_authid. Currently, PG10 has default rows in pg_authid. As a result, a copy from the controller to the shadow catalog can fail.

The solution can be to base64 encode all array data, just like anyarray type.

New Type

Introduction of a new data type into the system catalog can be done in two releases.

1. Add the new data type and supporting functions (such as in and out functions used by a copy command).
2. Add to the catalog table.

Unstable Database oid

As databases are recreated in the controller and later copied into the shadow catalog, pg_database oid can change. For example, database sdbmain could have oid of 65555 in master. In the controller the same database can generate oid 67777. This can cause a problem in the pgdata layout as database specific sub folders are named after db oid, eg $pgdata/base/67777. The second version may not be able to connect to sdbmain as its expected folder is missing (still $pgdata/base/65555). This can affect both user defined databases and built-in database template0 and postgres (template1 has fixed oid of 1). Options can be:

1. Having stable ids for three built-in databases and support nailing pg_database oid in pg_dump. This can work for user databases as these are always recreated during dump and restore. Template0, template1 and postgres are not dumped as they are created during initdb. Fixed ids can be assigned to template0 and postgres during initdb. To guarantee that these names have fixed oids, renaming/dropping of template0, template1 and postgres can be blocked. Otherwise, these can be renamed and a new database can be created with that name (e.g., alter database template0 rename to foo; create database template0). If this happens, template0 may have an unstable oid even if fixed ids are assigned to the built-in databases originally.

2. An alternative can be to find out template0/postgres oids in master and use the same oids during controller init db. Also enhance pg_dump to nail pg_database.oid for user created databases.

3. Adjust pgdata folder accordingly. Make a copy of pgdata, rename base subfolders to match oid change. While this works for single node upgrade, it may not work for multi-node cluster. During upgrade, different containers can temporarily have different versions. Having different database oids between different versions can cause issues (e.g., db oid is part of xlog messages such as LsmLock, LsmInvalidate).

4. Adjust copy command to remap oid. Database oid can be referenced in pg_replication_slots.datoid, possibly others, besides the primary key in pg_database, pg_tenant. The downside can be that it is easy to miss existing/new database oid FK columns. Oid vector type can be much harder to handle.

Relfilenode and mapping file

At this stage, the shadow catalog table can be created and populated.

Sample data in pg_catalog.pg_class

| Namespace | Relation name | Relation Location (relfilenode) |
|---|---|---|
| pg_catalog | pg_class | 0 (tracked in pg_filenode.map eg 12) |
| pg_catalog | pg_aggregate | 1000 |
| core | report | 70000 |
| sdb_shadow_catalog | pg_class | 80000 (randomly generated like any user table) |
| sdb_shadow_catalog | pg_aggregate | 80001 |

Matching data in sdb_shadow_catalog.pg_class

| Namespace | Relation name | Relation Location | New Location |
|---|---|---|---|
| pg_catalog | pg_class | 0 (tracked in file eg 12) | 0 (tracked in file 80000) |
| pg_catalog | pg_aggregate | 1000 | 80001 |
| core | report | 70000 | 70000 |

Physical location id for a relation can be stored in pg_class.relfilenode column for most tables and indexes, and in pg_filenode.map file for a small set of bootstrap relations. These together can specify the catalog. After the shadow catalog is populated, relfilenode in shadow pg_class can be updated.

```
-- in the shadow catalog pg_class equivalent, update relfilenode
pg_*** to the matching shadow one
update sdb_shadow_catalog.pg_class o
set relfilenode = (
    select n.relfilenode
    from pg_catalog.pg_class n
    where n.relnamespace = 'sdb_shadow_catalog'::regnamespace
    and n.relname = o.relname
)
where o.relnamespace = 'pg_catalog'::regnamespace
and o.relfilenode != 0
and exists (
    select n.relfilenode
    from pg_catalog.pg_class n
    where n.relnamespace = 'sdb_shadow_catalog'::regnamespace and
    n.relname = o.relname
);
```

A new function similar to shadow_splice( ) can be used to generate the second version pg_filenode.map file called pg_filenode.map.shadow in the same directory as pg_filenode.map

```
select create_shadow_relmapper(false, aa, 'catversion') from (
    select ('{' || string_agg(array_to_string(array[o.oid,
n.r elfilenode, o.relam], ','), ',') || '}')::oid[ ] as aa
        from sdb_shadow_catalog.pg_class o, pg_catalog.pg_class n
        where o.relnamespace = 'pg_catalog'::regnamespace
        and o.relfilenode = 0
        and o.relisshared = false
        and n.relnamespace = 'sdb_shadow_catalog'::regnamespace and
        n.relname = o.relname
);
```

This query goes through every second version mapped catalog relation (alias o).
1. If there is shadow table (true for all relations except pg_tenant and its indexes), the mapper file can be updated to use the shadow relation's location.
2. If there is no shadow table (pg_tenant), row the mapper file may not be updated. An implicit assumption is that relfilenode for pg_tenant does not ever change.
3. One corner case that may not be handled by this query is when the second version removes some mapped relations. As create_shadow_relmapper use the first version mapper file as a starting point (so that case 2 above can work), any removed relations from the second version may not be removed from the mapper file.

Important

It can be assumed that relfilenode field is never changed for tables that are not shadowed (pg_tenant only for now) (e.g., pg_tenant relfilenode is 2619. If it ever changes in the second version, say, to 3000, then it would look in location 3000 while the actual data is at 2619. This can be critical. Accordingly, a regress test can be used for this).

Since the function can only generate a new file locally, the function does not create any log records and cannot be replayed automatically in standbys. Options can be:
1. Connect to each container to execute this function. For all standbys, there can be a need to wait till log is caught up before executing the function (by comparing pg_get_system_visible_xcn at standby with pg_get_session_snapshot_xcn( ) at master?).
2. Log it so it can get to be replayed on all standbys. The file can be exactly 1024 bytes.
3. First doing sdb_basebackup before starting up a second version container. It can be relied on to propagate the file to standby. However, if master crashes, the new mapper file may be gone with it. Also disaster recovery (DR) standby only can connect to DR master, which does not have the mapper file.
4. A zookeeper, but each data center would have its own zookeeper cluster, still requiring cross data center messaging.

In the disclosed technologies, the second option can be preferred.

An important assumption here can be that the mapping file format does not change between the first version and the second version. As the shadow mapping file is written from the first version, but is used by the second version, if the format is changed, the second version may not be able to read the file. The shadow mapper file may need to be converted to the second version format before renaming to pg_filenode.map. A separate converter executable can be used.

In sdbdocker repo for container based deployment, pgdata can be wiped clean in upgrade and recreated by syncing to master using sdb_basebackup.

Clean Obsolete Catalog

The database core can generate, for example, 180 MB of catalog data. The old catalog data can be cleaned up after it is certain that this data are no longer needed. The earliest such time can be when the upgrade is completed successfully with master on the second version. Because at that time rollback can be prohibited, the old catalog can be safely deleted.

The old catalog is not immediately deleted after the second version comes up. This approach can simplify crash handling and can have forensic value.

A fixed number (e.g., 2) of old catalogs can be kept, each under its own schema, sdb_obsolete_catalog_<unix epoch timestamp>.

Upgrade first checks if the number of such schemas has reached a limit. If so, upgrade deletes the oldest schema. This is when an old catalog can actually be deleted.

A new schema with the naming convention can be created. The empty first version catalog tables/indexes/sequences can be created in it.

Relfilenode can be swapped with the second version shadow catalog.

Sample rows in pg_catalog.pg_class before upgrade

| relation | relfilenode |
| --- | --- |
| pg_catalog.pg_abc | 100 (points to LSM location with v1 catalog data) |
| sdb_obsolete_catalog_1111111.pg_a bc | 120 (points to LSM location with old catalog data upgraded at time 111111) |
| sdb_obsolete_catalog_1111112.pg_a bc | 150 (points to LSM location with old catalog data upgraded at time 111112) |

Sample rows in pg_catalog.pg_class during upgrade
Delete schema sdb_obsolete_catalog_1111111
Create schema sdb_obsolete_catalog_1111113, sdb_shadow_catalog

| relation | relfilenode |
| --- | --- |
| pg_catalog.pg_abc | 100 (points to LSM location with v1 catalog |
| sdb_obsolete_catalog_1111113.pg_a bc | 160 (empty table, no data in LSM) |
| sdb_obsolete_catalog_1111112.pg_a bc | 150 (points to LSM location with old catalog data upgraded at time 111112) |
| sdb_shadow_catalog.pg_abc | 200 (points to LSM location with v2 catalog |

Sample rows in sdb_shadow_catalog.pg_class during upgrade before relfilenode swap

| relation | relfilenode |
| --- | --- |
| pg_catalog.pg_abc | 100 (points to LSM location with v1 catalog data) |
| sdb_obsolete_catalog_1111113.pg_a bc | 160 (empty table, no data in LSM) |
| sdb_obsolete_catalog_1111112.pg_a bc | 150 (points to LSM location with old catalog data upgraded at time 111112) |

Sample rows in sdb_shadow_catalog.pg_class during upgrade after relfilenode swap

| relation | relfilenode |
| --- | --- |
| pg_catalog.pg_abc | 200 (points to LSM location with v2 catalog data) |
| sdb_obsolete_catalog_1111113.pg_a bc | 100 (points to LSM location with v1 catalog data) |
| sdb_obsolete_catalog_1111112.pg_a bc | 150 (points to LSM location with old catalog data upgraded at time 111112) |

The approach can allow multiple old catalogs. However, dump and load time can increase linearly with each copy. For performance, only one copy of obsolete schema can be kept up until the next upgrade. The next upgrade can first drop the old catalog, so pg_dump time may not be adversely affected. Since there is only one copy, a timestamp suffix may not be needed in the schema name.

Pg_control/pg-version

Binary file pg_control under PGDATA/global can have many fields. Two fields, pg_control_version and catalog_version_no, can be important to the upgrade. The values can be checked when postgres starts and if they do not match the executable, startup fails.

There can also be a PG_VERSION text file under PGDATA and each database sub-directory PGDATA/base/<dbID>. They can also be checked.

Therefore, there can be a need to update these files before the second version is run on the existing pgdata. This can be similar to renaming pg_filenode.map.shadow to pg_filenode.map. The orchestrator can handle this.

1. Shutdown the first version container.
2. Make a copy of its pgdata for the second version to use (can also do sdb_basebackup from master).
3. In the copy:
   a. rename pg_filenode.map.shadow to pg_filenode.map
   b. Update PG_VERSION files (needed whenever a merge from community is performed)
   c. Move pg_control_version and catalog_version_no. out to the storage catalog as described below.
2. Boot the second version container on the matching pgdata Alternatively, pgdata may not be needed and only essential data may be moved to the store catalog.

Storage Catalog Change

The system catalog number and sdb version number can be stored in the storage catalog.

SDB_Version_Num 301079000
System_Catalog_Num 201802070
SDB_Version_Num 0
System_Catalog_Num 0

The values can be the allowed system catalog number. Only the database executables with matching system catalog number can start up. There can be two slots because during the upgrade, a cluster may have two database versions running (e.g., high availability on the second version, master on the first version).

Initdb fills slot 1 with the current database and catalog version.

When the database server starts, it checks its catalog number with values from the storage catalog, and errors out if its catalog number does not match a system catalog number.

When performing the upgrade, master can set the second version catalog number in the other slot. <catalog_number, release_number> must be unique for the upgrade.

When master starts on the second version, it resets the slot containing the older catalog number.

The change introduces a more restrictive check. Before, the database binary and pgdata compatibility check are based on the PG version (e.g., 9.6) and the catalog version. Now these are based on the database version and the catalog version. This can have an implication of blocking a direct downgrade (e.g., by just bouncing the server). However, if such an action is desired, there is an SQL function to add the version to the storage catalog.

SUMMARY

Figure 14:
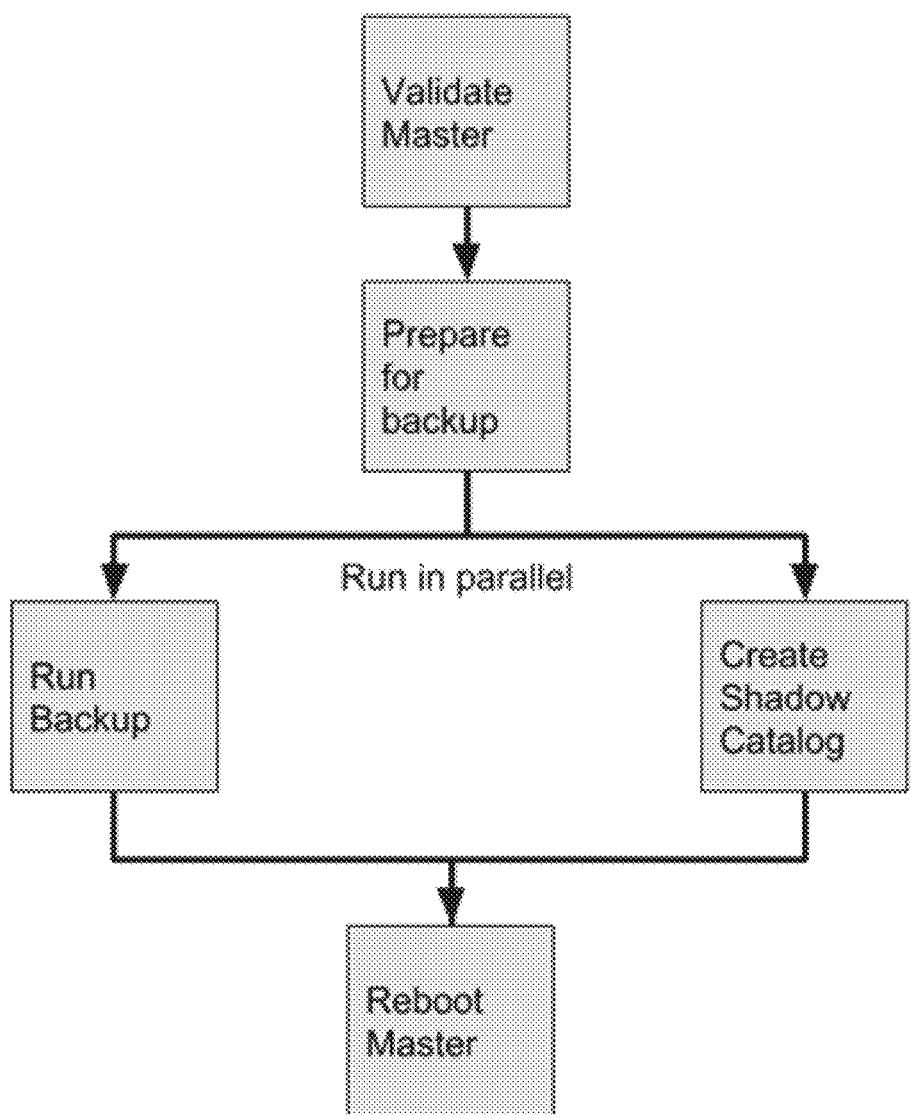
FIG. 14 is a flow diagram illustrating an example of some operations for upgrading a database from a first version to a second version, according to the disclosed technologies.

Steps to create the shadow catalog:
1. Validate that the source database is in a condition to be upgraded
2. Start up the controller
3. Block create/drop/alter certain database DDL files
4. Enable datallowconn for template0
5. Suspend workflow in both the source and the controller database
6. Create sdb_shadow_catalogschema with the configuration (i.e., shape) of the second version
7. Create sdb_obsolete_catalogschema with the configuration (i.e., shape) of the first version
8. Block certain DDL files (except tenant)
9. Dump the app schema
10. Load the app schema into the controller
11. Dump and load workflows from the source to the controller
12. Copy catalog tables from the controller to the shadow tables
13. If the tenant configuration (i.e., shape) has changed, dump and load tenants to shadow pg_tenant
14. Generate shadow pg_filenode.map, update relfilenode pointer in sdb_shadow_catalog.pg_class for catalog relations FIG. 14 is a flow diagram illustrating an example of some operations for upgrading a database from a first version to a second version, according to the disclosed technologies.

Figure 15:
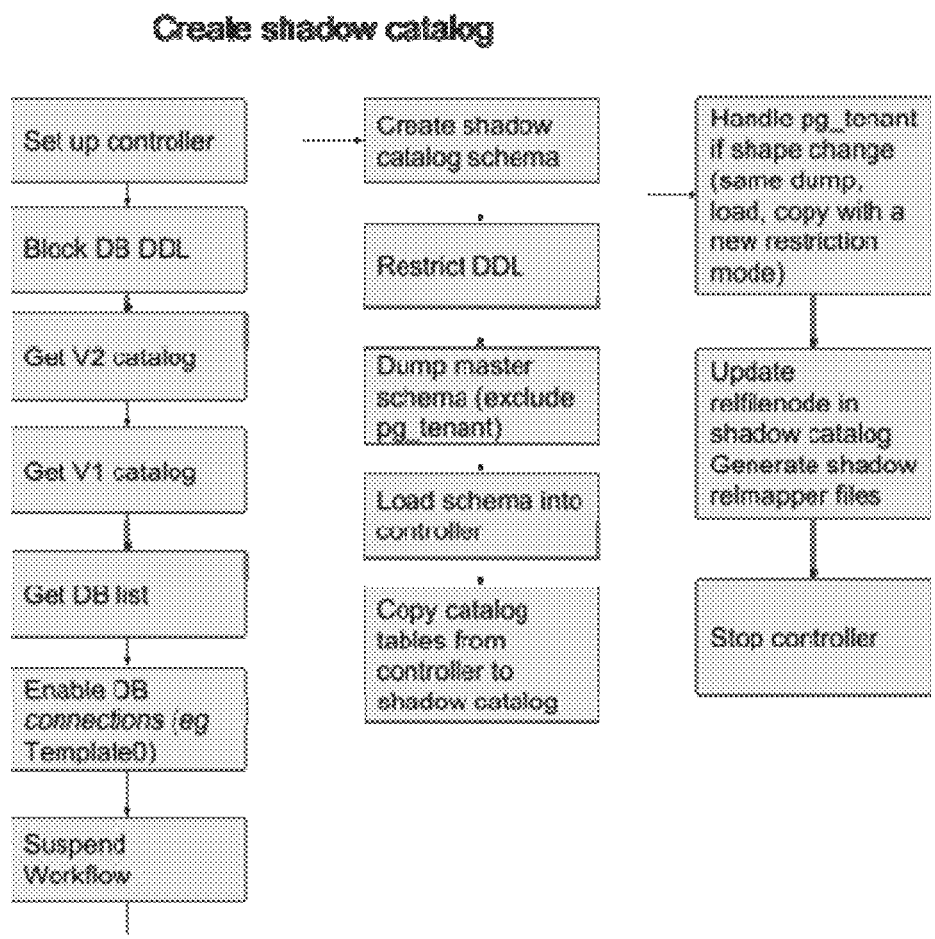
FIG. 15 is a flow diagram illustrating an example of operations for creating a shadow catalog, according to the disclosed technologies.

FIG. 15 is a flow diagram illustrating an example of operations for creating a shadow catalog, according to the disclosed technologies.

Figure 16:
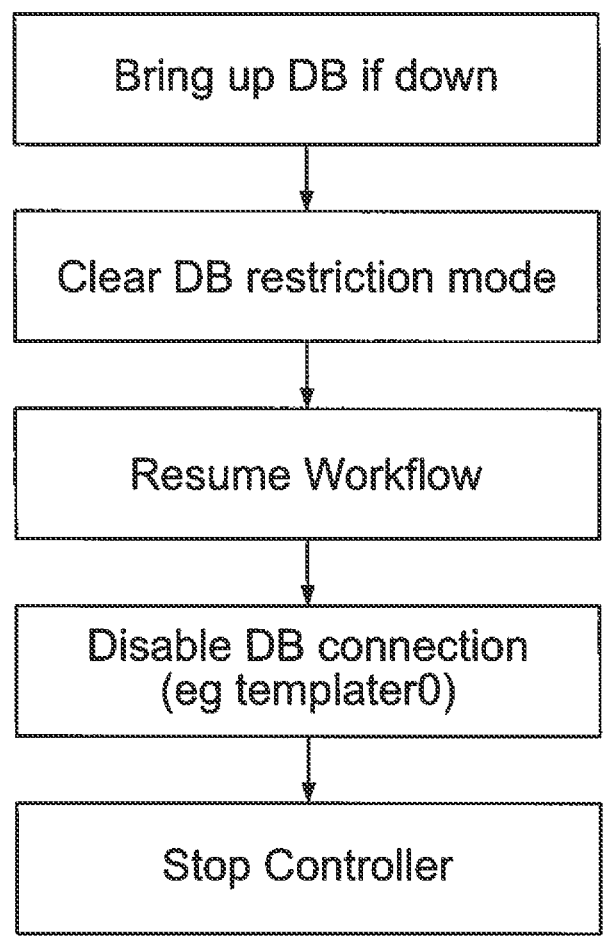
FIG. 16 is a flow diagram illustrating an example of operations for error and signal handling, according to the disclosed technologies.

FIG. 16 is a flow diagram illustrating an example of operations for error and signal handling, according to the disclosed technologies.

Testing
Catalog Data Correctness

Catalog data can include everything under pg_catalog schema, both shape and content. This can be tested by checking pg_dump output from a freshly installed database and an upgraded database.
1. Install the first version, set up some schema in the first version, run upgrade.
2. Install a new database with the second version and set up the same schema
3. Dump the catalog schema with pg_dump—schema=pg_catalog and app schema with pg_dump-all—schema-only from both versions and compare. They should be the same.

Data correctness

The upgrade does not touch user table data. The test can verify that relfilenode has not changed and dump some test table.

Restriction

Restriction mode, workflow pause, and template0 connectivity should all be set back to original values after the upgrade finishes. These can be tested when the upgrade succeeds and when the upgrade fails.

Delete old catalog

Before the upgrade, save relfilenode for catalog relations. After the upgrade, check such relfilenode has no data in log-structured merge (LSM).

Failure cases

The upgrade can be aborted when there is any failure. Some failure cases can include:
1. Master crash
2. Controller crash
3. Lose master status
4. Network/disk error
5. Upgrade script/orchestrator crash The upgrade script would try to exit database restriction mode (no-ddl, no db, no tenant, etc.) and revert the connection setting for template0. However, it may not always be possible to do so when master crashes. The operator has two choices after the database comes back up:

Invoke a cleanup function to exit from restriction mode (in a configuration, this can be done automatically whenever a master is started/promoted).

Retry the upgrade. The log and artifacts (e.g., the partly completed shadow catalog) can be used to diagnose the problem.

App Test

A suite of app tests (currently precheckin) can be run before and after the upgrade and verify that a failed test post upgrade is a subset of failures before the upgrade. A more comprehensive suite than precheckin (eg basic ftests) can be better.

Performance Test
1 Test of other than the upgrade itself. This can test that upgraded database has no performance degradation.
2 Test of the upgrade itself.

App Developer Specific Tests
1. Multiple app branches (e.g., 214, main)
2. Test every database version supported by the upgrade as a source version (301.84)
3. Database Ant/blt targets
   a. sdb.start
   b. sdb.stop
   c. sdb.ngupgrade
   d. sdb.ngupgrade_maybe
   e. sdb.rollback_ngupgrade
4. Both OSX and Ubuntu
5. Destructive tests
   a. When the upgrade fails, the user can still use the first version database.
6. Clean obsolete data extents
   a. Because sdb_basebackup can be used to backup the database during the upgrade, obsolete data can be deleted when no longer needed.

Backup

Because there is a chance of data corruption, from either the upgrade or the new second version binary, it can be important to backup the database right before the update. Sdb_basebackup can be used to create a backup. On sfstore, the clone option can be used. It can be much faster because it only needs to copy the latest log extent. For app devs on pgfilestore, the faster clone option may not work. The slower backup option can copy all data/log extents. Backup can run at the start of the upgrade, concurrently with creation of the shadow catalog. Testing on a dev box with SSD shows that backup throughput can be about 1 GB/10 seconds, or 60 GB in the time it takes to create the shadow catalog (about 10 minutes).

PG10 Challenges

Some of the PG10 changes can break the shadow catalog upgrade. List of problems and solutions can include:
1. New pg_data layout: It renames pg_clog to pg_xact and pg_xlog to pg_wal. Solution: rename the same directories in the old pgdata.
2. pg_control file format change. A new security field mock_authentication_nonce has been added. Solution: Create a new binary that can upgrade pg_control file.

3. Xlog page magic number change. It seems postgres changes the magic number in every major release. Postgres does not want a new binary to run on an old database.

Solution: the next generation upgrade can use the same xlog files. The xlog page magic number does not need to be kept stable. This is a short term fix, which can present problems if the xlog format changes in the next community release. The long term solution can be to get rid of community xlog, and, in a bigger context, the entire pgdata directory. The database does not, for the mostpart, use community xlog. The database still writes certain records (e.g., db shutdown) inherited from postgres.

4. New catalog data types. This can generally require cherry-picking the new types from postgres and a new release barrier. Solution: In the case of PG10, the new types, pg_ndistict and pg_dependencies, can be cast to bytea type.

5. New default roles. Some catalog columns are aclitem[ ] type. Aclitem validates the role name in its in/out functions. This can break upgrade as aclitem is dumped from PG10 and may not be accepted in PG9.6. Solution: Raw bytes can be base64 encoded/decoded directly in copy commands. This can include all array types. This can allow for validation to be skipped, which is acceptable because the data are meant to be used by the second version binary.

Rolling Upgrade

A rolling upgrade can start with primary.
1. Stop a first version standby container (pgdata inside the container can be mounted to the host and moved to temp dir after shutting down.)
2. Start the second version container on the same node
   a. The shadow relmapper file can be obtained from sdb_basebackup (otherwise, there can be a need to wait for standby to catch up and create the shadow relmapper from the log record)
   b. The shadow relmapper file can be renamed to pg_filenode.map
3. The above operation can be repeated for all standbys
4. Primary can be stopped, failover to a standby
5. The newly promoted second version master can create a log record with its version. Standbys can pause log replay if the standby version is older.
6. The old primary can be restarted as standby. Primary site can be done.
7. The above operations can be repeated at the disaster recover (DR) site Post upgrade Post upgrade actions can include:
Exit the no DDL mode
Delete the old catalog
Perform any verification Error Handling The first rollout of this new upgrade can be to app developers. Initial implementation can be in python. The python upgrade script can handle the entire process, including server reboot, and can replace sdbinstall based sdb upgrade.

There may be failures and crashes at any point during the upgrade. A crash can be when the script stops running unexpectedly (e.g., power down, etc.) or cannot connect to the database (e.g., network issue, shutdown). In such a case, the script cannot perform cleanup work. Failure can include all other cases where cleanup is possible. Failure can be handled automatically while crash can require manual cleanup by invoking an ant target. (In a configuration, cleanup can be invoked with sdb.start so that no manual cleanup is needed).

During shadow catalog creation
Artifacts:
   1. Schema: sdb_shadow_catalog, sdb_obsolete_catalog
   2. Template0.datallowconn setting
   3. Database restriction mode (pg_database.rmode)
   4. Workflow pause mode
   5. Controller sdb instance
Failure: undo operations 2, 3, 4, and 5 above. Schemas can be kept without harm and cleaned up during the next run.
Crash: user can invoke an ant target to undo operations 2, 3, and 4 (now a part of sdb.start ant target). The upgrade controller, if it is still running, needs to be manually shutdown. In a configuration, the databases can do this automatically.

During server restart
Actions:
   1. Flush the first version
   2. Add new release number to the store catalog
   3. Stop the first version
   4. Copy first version pgdata for second version (cp ~/sdb/sdbdata/<cluuid> ~/sdb/sdbdata/<cluuid>_v2). If using sdb_basebackup, there can already be a pgdata cloned from the first version.
   5. Update the second version pgdata (relmapper file, PG_VERSION file, and postgresql.conf)
   6. Start the second version
Error handling can be the same as shadow catalog creation Post upgrade
Actions:
   7. Optionally, remove old release number from the store catalog
   8. Stop the controller (async, ignore result)
   9. Update both the current binary and pgdata symlink. This can be managed outside of the python script, by caller (ant).
      a. ~/sdb/sdbbuild/current
      b. ~/sdb/sdbbuild/current.previous
      c. ~/sdb/sdbdata/sdbmain
      d. ~/sdb/sdbdata/sdbmain.previous
Crash:
Before/During operation 7: it is not critical to remove the release number in the storage catalog.
Before/During operation 8: The controller can be left running. The user may need to stop it manually.

Rollback

Rollback can be allowed in a case where there are severe issues in the second version or the upgrade script itself. The upgrade script can back up the database (sdb_basebackup clone/backup cmd). Changes after backup are lost.

Self-Driving Database (SDDB) Interface

Production rollout for the shadow catalog upgrade can be built on the self-driving database (SDDB) framework.

In each state transition, the workflow orchestrator can call a "function" implemented by the upgrade team.

These functions can be implemented in a Go package in the SDDB repo. They can be compiled into the SDDB orchestrator. The functions can call out to sdb binaries, such as psql, pg_dump, and pg_dumpall, that must match the second version, as well as standard linux commands (cp, cat, awk, and sed). The host that the orchestrator is running on should be able to connect to the databases server with psql.

If any function returns an error, the workflow can be aborted (after clean up).

Since next gen upgrade should not be maintained in both current python script and go package, the orchestrator can handle upgrade in the app developer environment as well. Upgrade in the developer environment can be quite different from the production environment (container vs. non-container, single node vs. high availability (HA)/disaster recovery (DR), etc.). In a configuration, a single orchestrator can be built to handle both. In another configuration, another go binary can be created to handle the app developer environment. Creation of the shadow catalog can be common to both approaches.

Step Details

Update steps can be executed logically at two places: (1) the upgrade binary/orchestrator and (2) upgrade controller. The Self-Driving Database controller can be a long running process accessible via gRPC. Therefore, the orchestrator can communicate with the controller by gRPC. In the short term, the controller may not be in the SDB image. For the update binary designed for app devs, it can compile with the controller code as a single binary.

Entry criteria check
Work
   Check that the database version is new enough to support the shadow catalog upgrade.
   Check that the database version is older than the target version; if so, downgrade is not allowed.
   Check that there is no release barrier between the source and the target versions.
   Check that the database restriction mode is clear to prevent concurrent upgrade.
Cmd: validateMaster
Actor: the upgrade binary/orchestrator; alternatively can be master database's controller
Step 1: run sdb_basebackup in parallel
Work: update postgresql.conf and pg_hba.conf if needed to support sdb_basebackup. Run sdb_basebackup.
Actor: the upgrade binary/orchestrator.
Step 2: create the upgrade controller
   The upgrade controller can run in the container. The Self-Driving Database orchestrator can download its docker image and start it. The upgrade controller needs some uncommon configuration parameters such as disabling logging, binary upgrade mode, etc. The config file is part of the image.
   App Devs do not use containers.
Cmd: setupController
Actor: the upgrade binary/orchestrator
Step 2.1: validate upgrade controller
Placeholder
Step 3: disable logical database creation
Work
   Block db DDL
Cmd: BlockDbDDL
Actor: the upgrade controller
Step 4: get catalog information from V1 (master) and V2 (controller)
Work
   Get pg_catalog, information_schema, inspector schema information
Cmd: GetCatalogInfo
Actor: the upgrade controller
Step 5: enable the database connection, pause workflow
Work
   Enable template0 connection (both the master and the upgrade controller)
   Pause workflow (both the master and the upgrade controller)
Cmd: EnableDBConnectionSuspendWorkflow
Actor: the upgrade controller
Step 6: create shadow catalog schema
Work
   Create schema sdb_shadow_catalog and sdb_obsolete_catalog
Cmd: CreateShadowSchemaDef
Actor: the upgrade controller
Step 7: Disable DDL
Cmd: restrict_ddl
Actor: the upgrade controller
Step 8: Create the shadow catalog data
Work
   Pg_dumpall schema from the source
   Psql load into the upgrade controller
   Copy from the controller to the file
   Copy from the file to the source shadow tables
   Sync the shadow catalog sequences
   If pg_tenant changes shape, dump and load tenants
   Update relfilenode inside the shadow schema
   Generate the shadow relmapper file
Cmd: createShadowSchemaData
Actor: the upgrade controller
Step 9: stop the upgrade controller
Cmd: stopController( )
Actor: the upgrade binary/orchestrator
Step 10.a: Reboot Master (APP DEVs)
Work
   Flush
   Add new release to the storage catalog
   Rename the shadow relmapper file
   Reboot bkproxy
   Sanity Check the second version
Cmd: rebootMaster
Actor: the upgrade binary
Step 10.b: Shutdown the first version container and startup the second version container
   Actor: the orchestrator (need to rename the shadow relmapper)
Step 11: Exit restriction mode
Work
   Clear database restriction mode
   Disable template0 connection
   (workflow pause mode may not be persisted)
Cmd: clear_restriction
Actor: the upgrade binary/orchestrator
Step 12: Clean Up
Work
   Delete the old catalog
   Remove the old release from the storage catalog
   Shutdown the upgrade controller
Cmd: clean_up
Actor: the upgrade binary/orchestrator
Golang prototype
   Golang version can be built in the SDD repo, separate from the database. The binary can support a—version flag that prints version information, starting from 1.0.0. Golang can support a cross platform compile. The build script can build linux and osx binaries (e.g., all amd64) and check into the SDB source tree. The SDB build script can pick the right binary into its build folder.
   SDD can branch for each ngupgrade release.
Log Replay Backward Compatible
   When a master is still on the first version and a standby is upgraded to the second version, the standby can replay logs generated by the first version binary.

A related requirement can be for a database standby instance to pause log replay if it detects a version change. In high availability (HA), standby can be upgraded first. However, disaster recovery (DR) instances can be upgraded independently from primary. If primary is upgraded before disaster recovery (DR), disaster recovery (DR) would see second version logs, which it should not process until it has been upgraded.

Otimization

As long as a catalog table does not change (schema and builtin data), there may be no need to create a shadow table. This can be especially important for pg_tenant. Some simple tables can be handled the same way, if necessary, such as pg_workflow and pg_statistics.

Recommendations for Upgrade
    Avoid pgdata change
    Relmapper file
    pg_control file
    Avoid new catalog data types
    May require staging
    Avoid pg_tenant change
    Exempt from DDL lock
    Upgrade cannot block org sign up

SUMMARY

Figure 17:
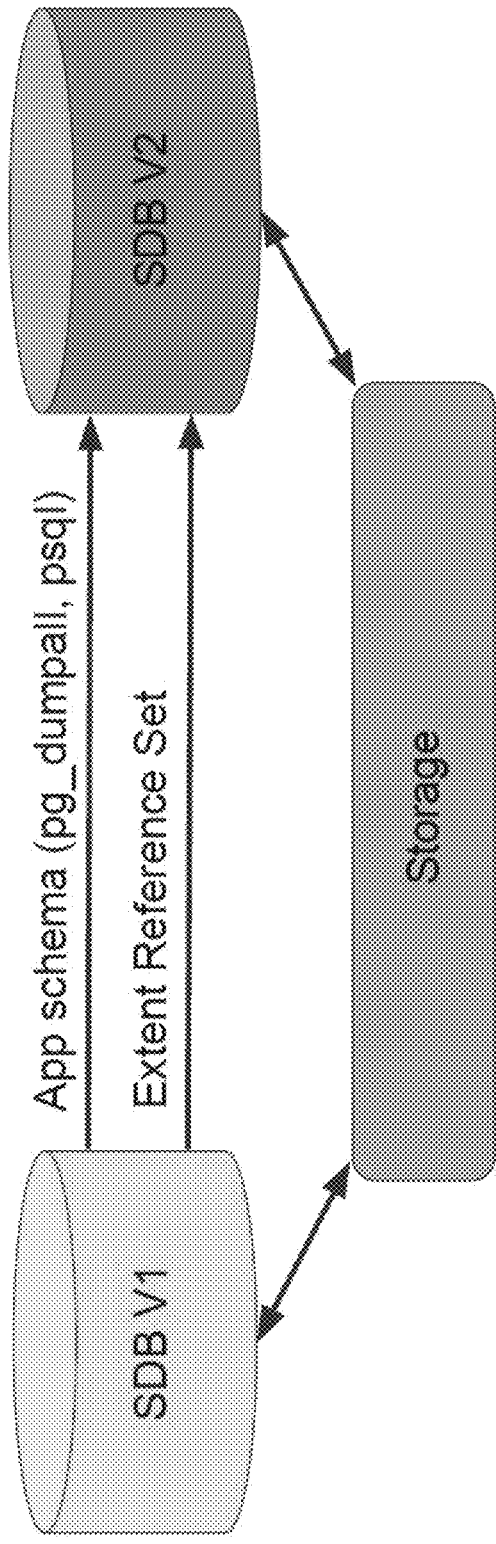
FIG. 17 is a diagram illustrating an example of conventional operations to upgrade the database to the second version.

Shadow catalog matching the second version binary
A lot of pointer (relfilenode) manipulations
Problems solved:
    No need for extra production SKU database server
        Use a lightweight database instance running on orchestration node
    Reduce time to upgrade disaster recovery (DR)
        The shadow catalog is created one in primary site and replicated to disaster recovery (DR)
App Development
    Backup the database before rebooting the second version
    Failures until reboot the database on the second version
    The shadow catalog that can only be used with the second version image
    Any artifact left from the previously failed run can be cleaned up in the subsequent run
    Reboot the database on the second version
    Shutdown the first version
    Promoting the second version relmapper file
    Update pg_version file
    Updating the postgresql.conf file
    Bring up the second version on the modified pgdata
    Backup the first version before the reboot process using
sdb_basebackup with
—type=backup
sdb_basebackup
    —type=backup
        Sends the files under PGDATA, the storage catalog, and the extents from the snapshot over the tar stream
        Extracts the files from the stream into the backup PGDATA
        Creates all the extents with new extent ids
        Creates a new storage catalog with a new CLUUID containing references to the remapped extent ids
    Future: —type=clone
    Issue: On pgfilestore, the database is not aware of other instances using the same store
    On SSD, for 1 GB of data and full app schema—sdb_basebackup with backup option takes 1.5-2 minutes Testing
    Performing same version upgrade:
        Making sure data is intact, can do DDL and DML
        Making sure release numbers in the storage catalog and the shadow rel mapper file get replicated to disaster recovery (DR)
    sdb.ngupgrade with app running:
        Running ngupgrade as a workload concurrently with chatter workload
        Using sfstore
    sdb.ngupgrade with ftests:
        Running ftests before and after ngupgrade
        Checking either the first version or the second version database is running when error happens in ngupgrade
    sdb.ngupgrade_clean:
        All database restriction modes should be off
        template0 should not allow access
    sdb.rollback_ngupgrade
        After rollback, a previous version of the database should be running
        Symlinks change after rollback FIG. 17 is a diagram illustrating an example of conventional operations to upgrade the database to the second version.

Figure 18:
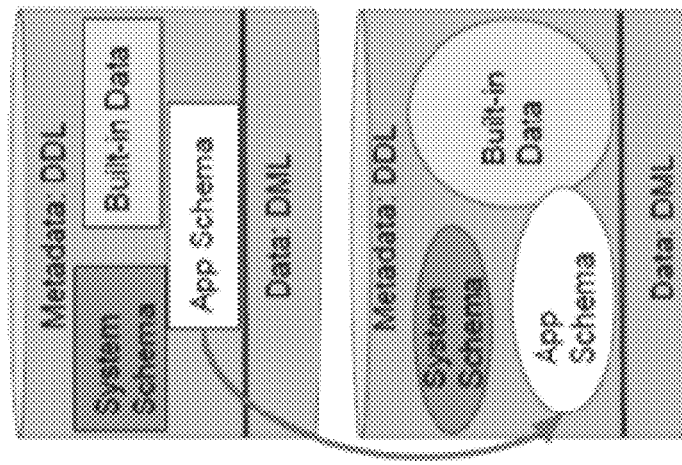
FIG. 18 is a diagram illustrating another example of operations to upgrade the database to the second version, according to the disclosed technologies.

FIG. 18 is a diagram illustrating another example of operations to upgrade the database to the second version, according to the disclosed technologies.

Figure 19:
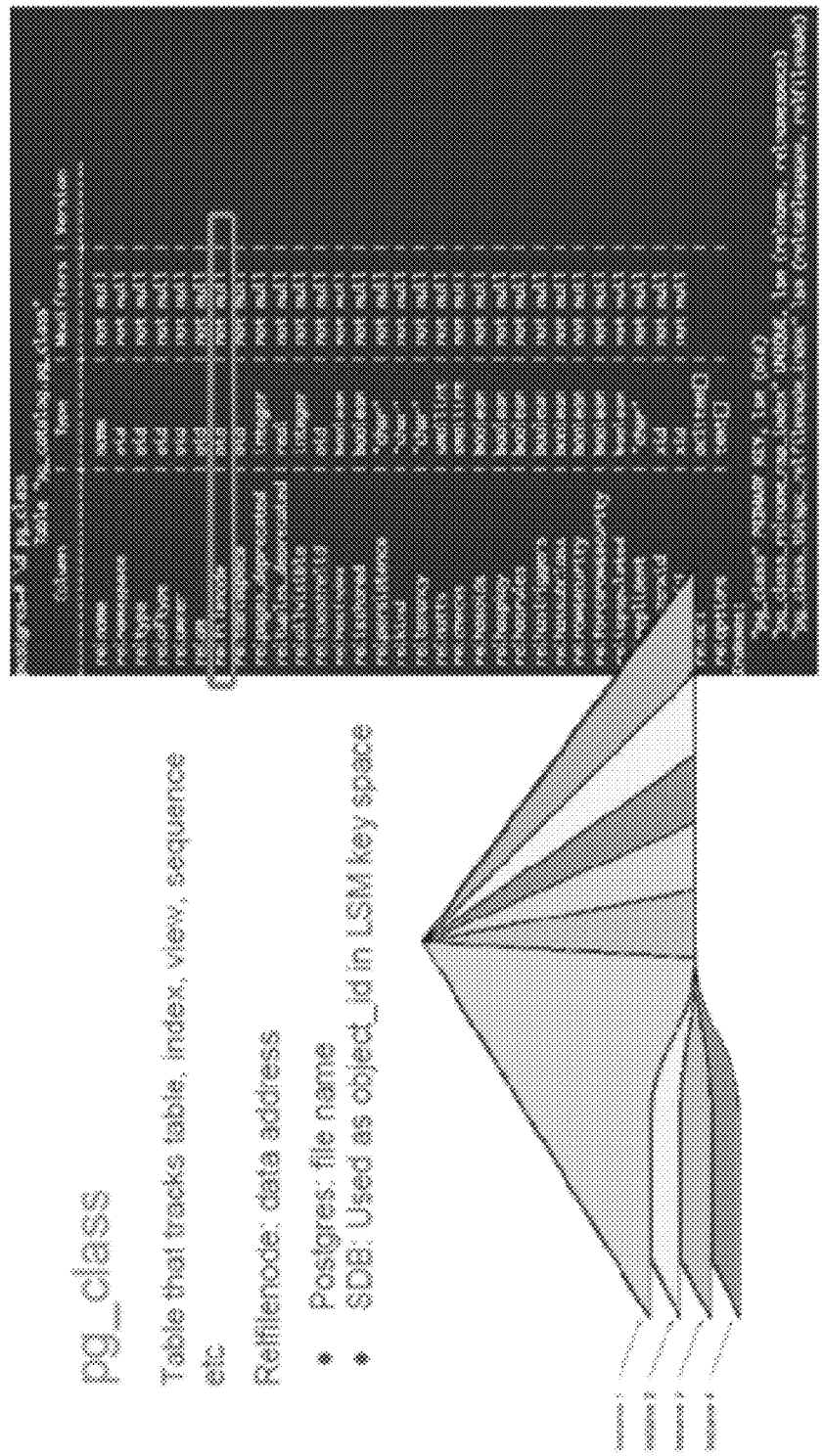
FIG. 19 is a diagram illustrating an example of pg_class.

FIG. 19 is a diagram illustrating an example of pg_class.

FIG. 20 is a diagram illustrating an example of a Relmapper file.

Figure 21:
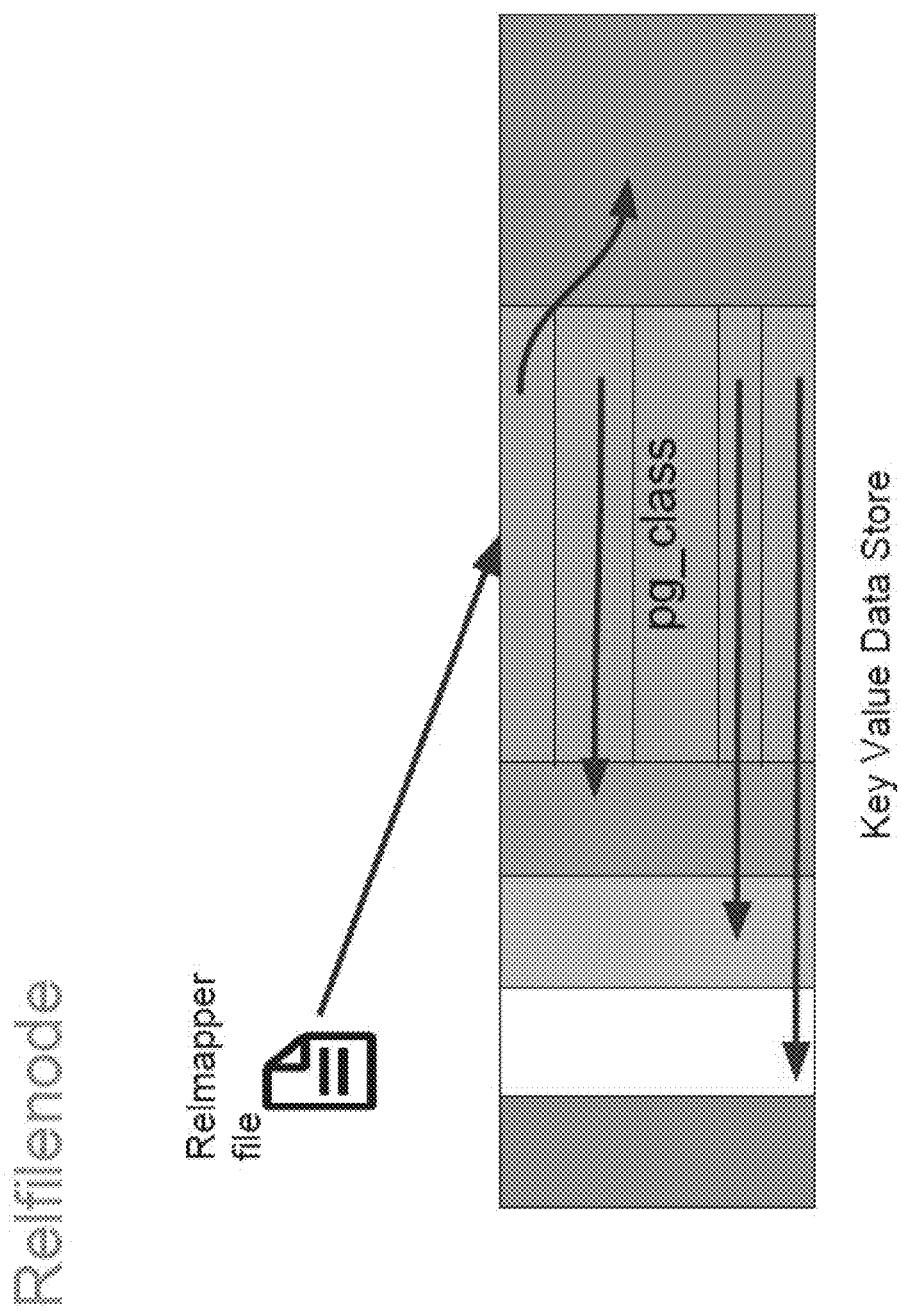
FIG. 21 is a diagram illustrating an example of a Relfilenode.

FIG. 21 is a diagram illustrating an example of a Relfilenode.

Figure 22:
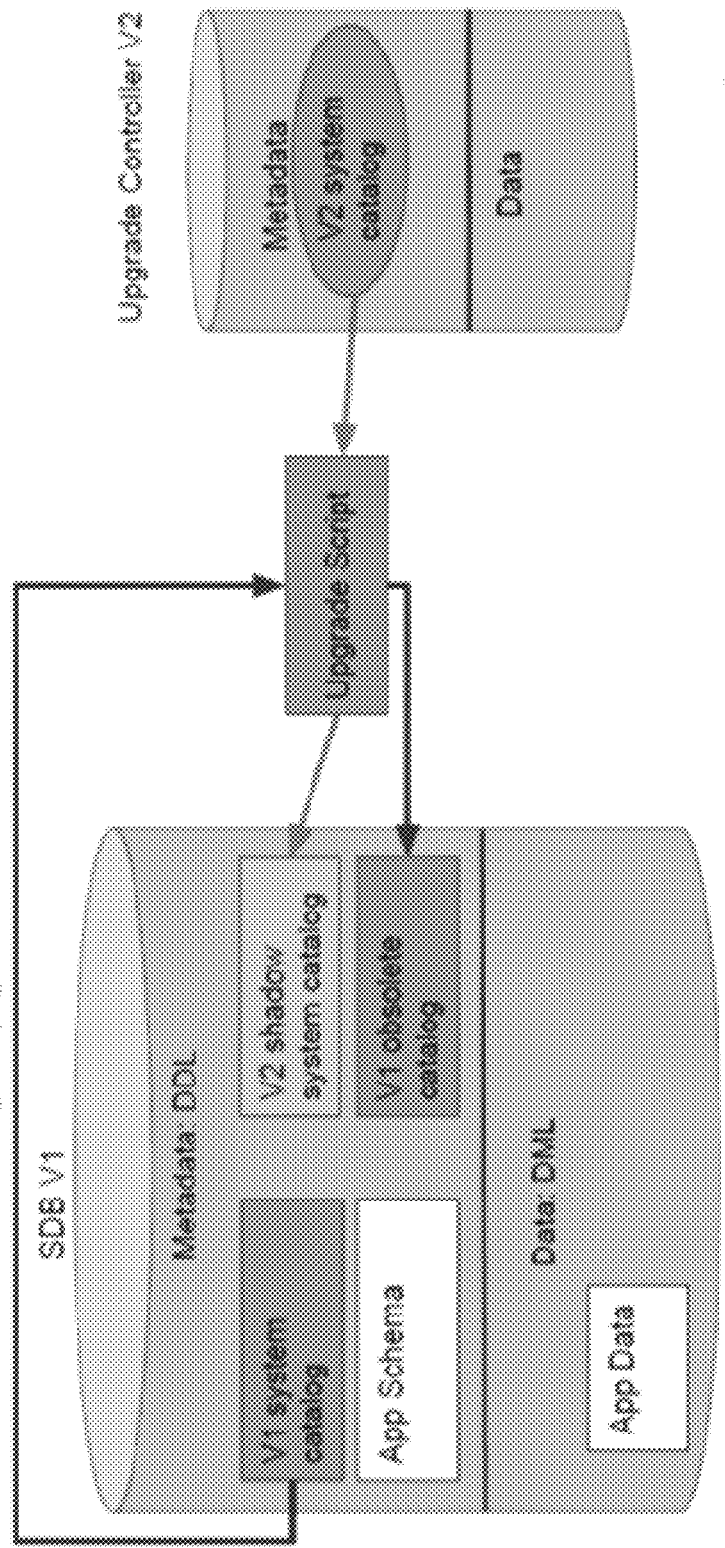
FIG. 22 is a diagram illustrating yet another example of operations to upgrade the database to the second version, according to the disclosed technologies.

FIG. 22 is a diagram illustrating yet another example of operations to upgrade the database to the second version, according to the disclosed technologies.

FIG. 23 is a diagram illustrating an example of sample data in pg_catalog.pg_class.

Figure 24:
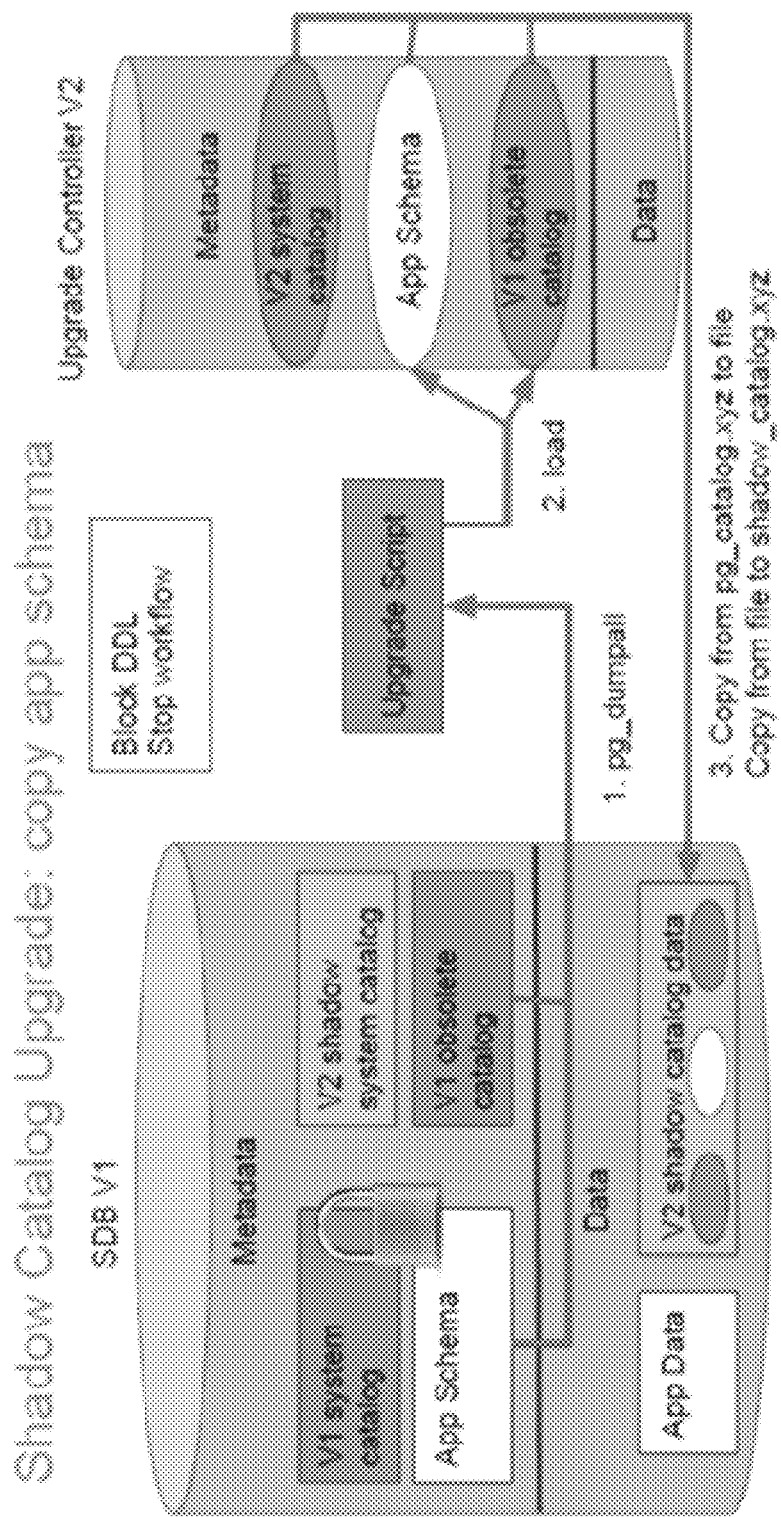
FIG. 24 is a diagram illustrating still another example of operations to upgrade the database to the second version, according to the disclosed technologies.

FIG. 24 is a diagram illustrating still another example of operations to upgrade the database to the second version, according to the disclosed technologies.

FIG. 25 is a diagram illustrating an example of sample data in pg_catalog.pg_class after copy to a shadow catalog.

Figure 26:
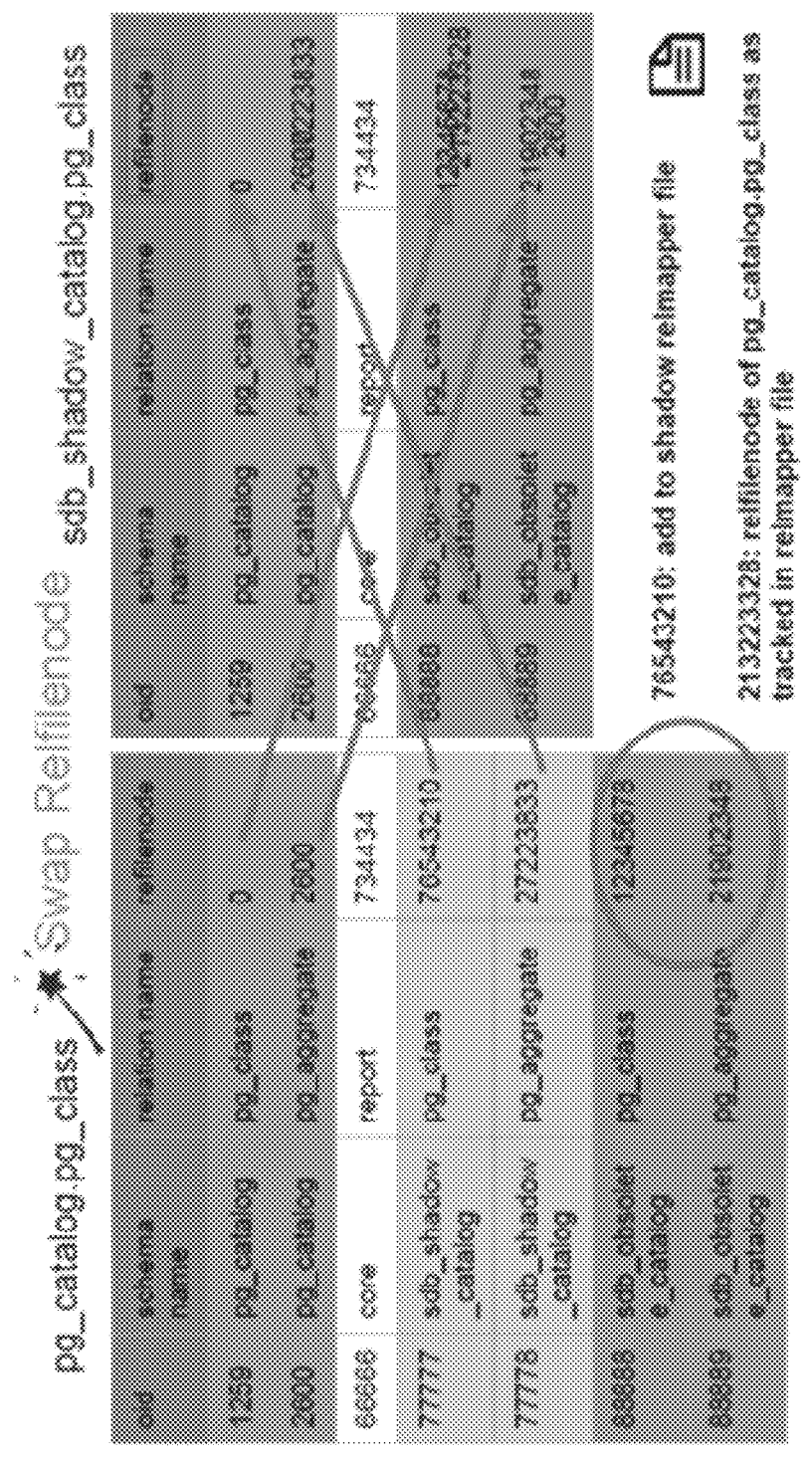

FIG. 26 is a diagram illustrating an example of a Relfilenode swap.

Figure 27:
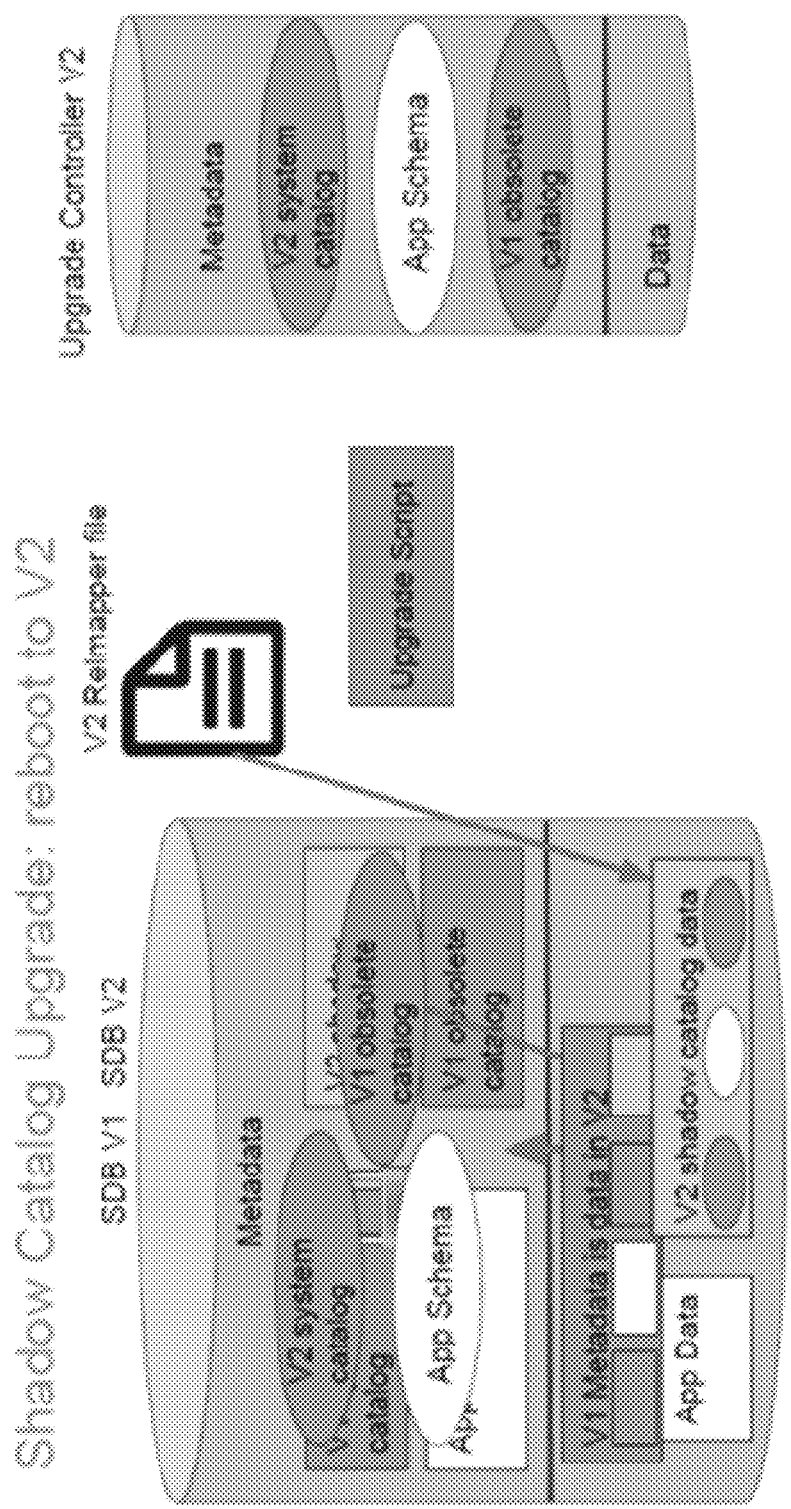
FIG. 27 is a diagram illustrating an example of a shadow catalog upgrade.

FIG. 27 is a diagram illustrating an example of a shadow catalog upgrade.

Figure 28:
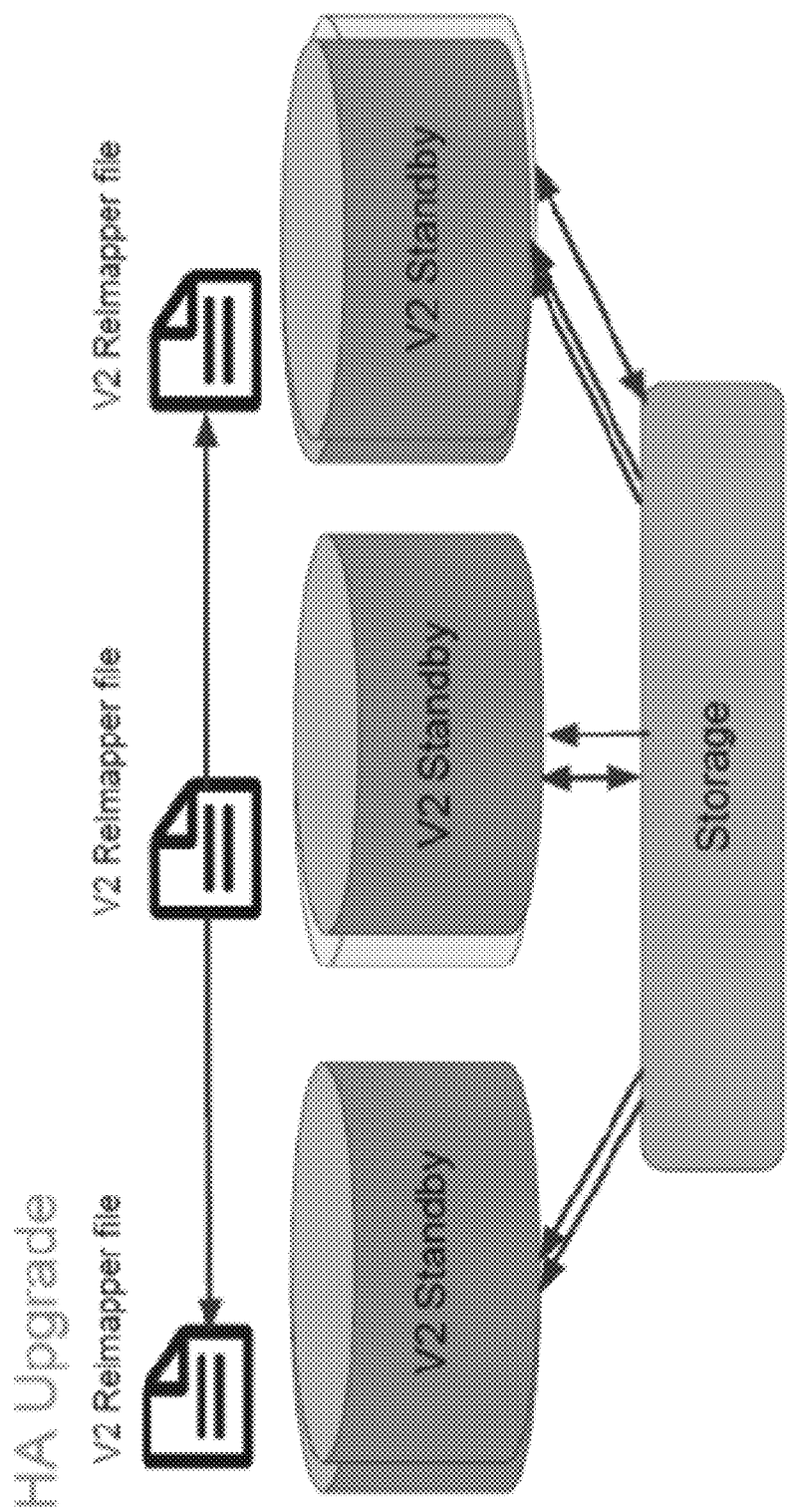
FIG. 28 is a diagram illustrating an example of a high availability (HA) upgrade.

FIG. 28 is a diagram illustrating an example of a high availability (HA) upgrade.

Figure 29:
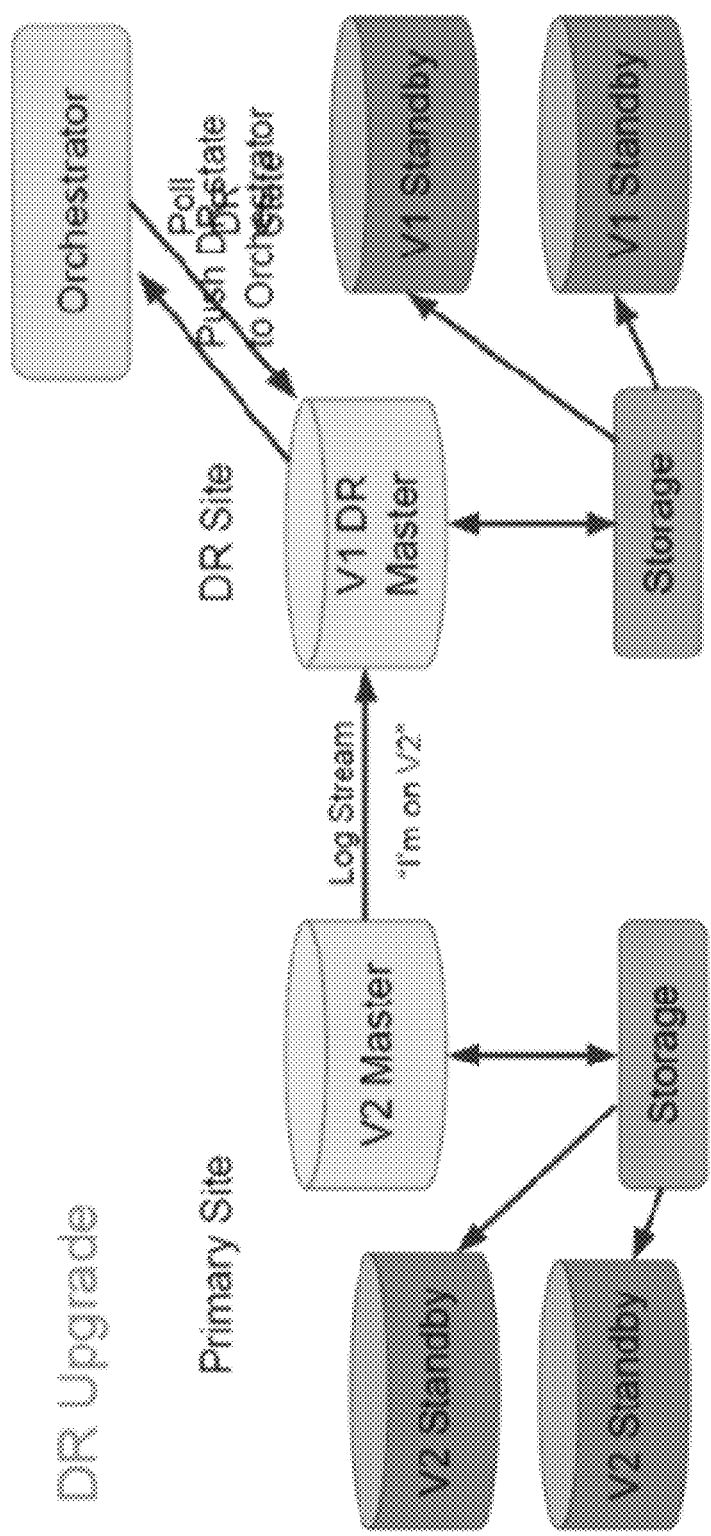
FIG. 29 is a diagram illustrating an example of a disaster recovery (DR) upgrade.

FIG. 29 is a diagram illustrating an example of a disaster recovery (DR) upgrade.

Figure 30:
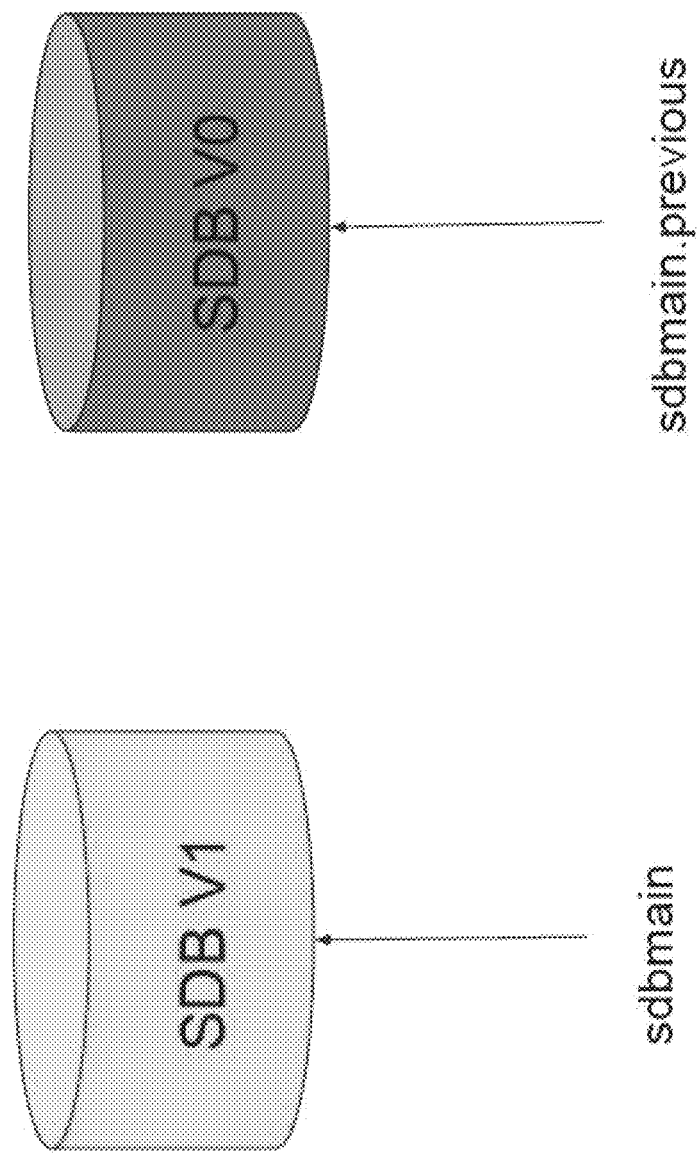
FIG. 30 is a diagram illustrating an example of managing symlinks.

FIG. 30 is a diagram illustrating an example of managing symlinks.

Figure 31:
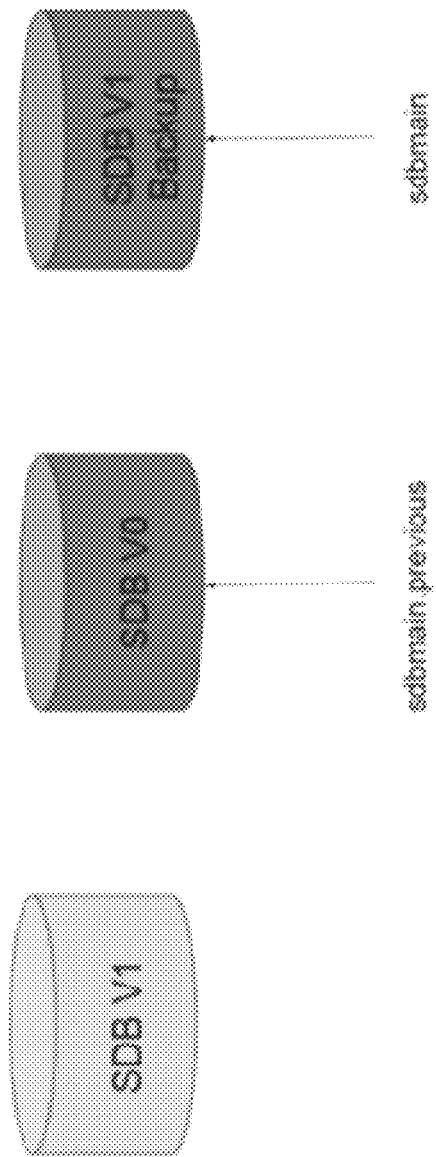
FIG. 31 is a diagram illustrating an example of managing symlinks just before reboot.

FIG. 31 is a diagram illustrating an example of managing symlinks just before reboot.

Figure 32:
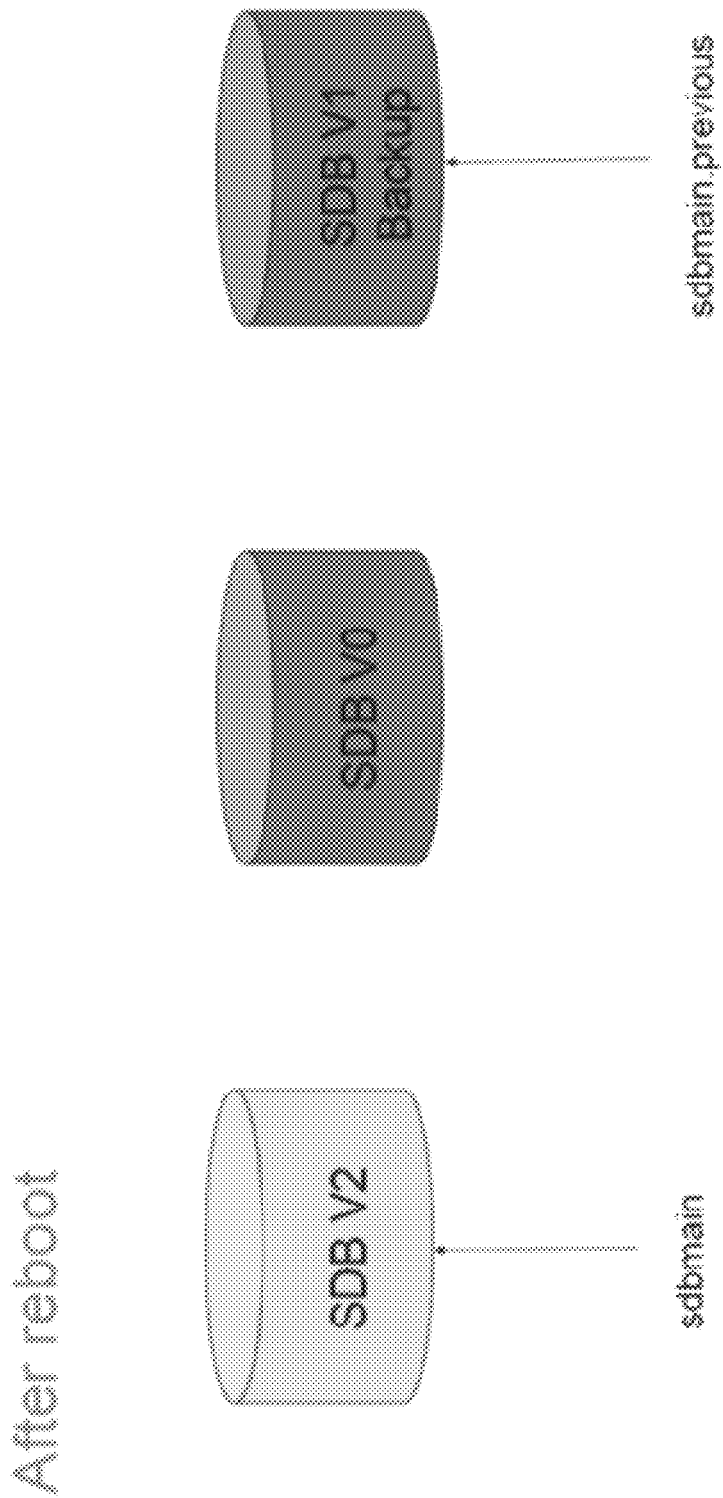
FIG. 32 is a diagram illustrating an example of managing symlinks after reboot.

FIG. 32 is a diagram illustrating an example of managing symlinks after reboot.

Various implementations for upgrading a database from a first version to a second version can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for upgrading a database from a first version to a second version.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for upgrading a database from a first version to a second version.

When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for upgrading a database from a first version to a second version.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for upgrading a database from a first version to a second version, the method comprising:
   operating, by a first processor, a first version of a database management system of the database;
   operating, by a second processor, a second version of the database management system of the database;
   receiving, by the second processor and from the first processor, a copy of a database application schema;
   producing, by the second processor and using the second version of the database management system and the copy of the database application schema, an original version of a database catalog for the second version of the database management system;
   receiving, by the first processor and from the second processor, a copy of the original version of the database catalog for the second version of the database management system;
   producing, by the first processor, a catalog for an upgrade of the database, the catalog for the upgrade having tables and indices that are identical to tables and indices included in the copy of the original version of the database catalog for the second version of the database management system;
   saving, by the first processor and in the catalog for the upgrade, the copy of the original version of the database catalog for the second version of the database management system; and
   causing, by the first processor and for information in the catalog for the upgrade, a change in references to locations of data in the database from being with respect to an organization of the database according to the first version of the database management system to being with respect to an organization of the database according to the second version of the database management system.

2. The method of claim 1, wherein the first processor is different from the second processor.

3. The method of claim 2, wherein a processing speed of the second processor is less than a processing speed of the first processor.

4. The method of claim 1, wherein a duration of time of an event in which, during the upgrade of the database, the database is unresponsive to a request is a short duration of time.

5. The method of claim 4, wherein the short duration of time is less than or equal to thirty seconds.

6. The method of claim 1, wherein an upgrade of the database application schema is suspended during the upgrade of the database.

7. The method of claim 1, further comprising ceasing, by the first processor and in response to a completion of the change in references, an operation of the first version of the database management system by the first processor.

8. The method of claim 7, further comprising starting, by the first processor and in response to the completion of the change in references, an operation of the second version of the database management system by the first processor, wherein the operation of the second version of the database management system by the first processor uses the catalog for the upgrade as a working version of the database catalog for the second version of the database management system.

9. The method of claim 8, wherein the working version of the database catalog for the second version of the database management system is configured to store metadata related to the database application schema and related to the database management system.

10. The method of claim 8, further comprising causing, by the first processor, the second version of the database management system to interact with data stored in a storage of the database.

11. The method of claim 10, wherein the causing the second version of the database management system to interact with the data stored in the storage of the database is performed on a portion of the data in response to a request to access the portion of the data.

12. The method of claim 11, wherein the upgrade of the database is performed in a manner that is imperceptible to a user of the database.

13. The method of claim 8, further comprising:
   ceasing, by a third processor and in response to the completion of the change in references, an operation of the first version of the database management system by the third processor; and
   starting, by the third processor and in response to the completion of the change in references, an operation of the second version of the database management system by the third processor.

14. The method of claim 13, wherein the ceasing by the third processor and the starting by the third processor occur after the ceasing by the first processor and the starting by the first processor.

15. The method of claim 14, wherein the first processor and the third processor are associated with a same cluster of the database.

16. The method of claim 14, wherein:
the first processor is associated with a primary cluster of the database; and
the third processor is associated with a disaster recovery cluster of the database.

17. A non-transitory computer-readable medium storing computer code for upgrading a database from a first version to a second version, the computer code including instructions to cause:
a second processor to:
operate a second version of a database management system of the database;
receive, from a first processor, a copy of a database application schema; and
produce, using the second version of the database management system and the copy of the database application schema, an original version of a database catalog for the second version of the database management system; and
the first processor to:
operate a first version of the database management system of the database;
receive, from the second processor, a copy of the original version of the database catalog for the second version of the database management system;
produce a catalog for an upgrade of the database, the catalog for the upgrade having tables and indices that are identical to tables and indices included in the copy of the original version of the database catalog for the second version of the database management system;
save, in the catalog for the upgrade, the copy of the original version of the database catalog for the second version of the database management system; and
cause, for information in the catalog for the upgrade, a change in references to locations of data in the database from being with respect to an organization of the database according to the first version of the database management system to being with respect to an organization of the database according to the second version of the database management system.

18. A system for upgrading a database from a first version to a second version, the system comprising:
a second processor configured:
operate a second version of a database management system of the database;
receive, from a first processor, a copy of a database application schema; and
produce, using the second version of the database management system and the copy of the database application schema, an original version of a database catalog for the second version of the database management system; and
the first processor configured to:
operate a first version of the database management system of the database;
receive, from the second processor, a copy of the original version of the database catalog for the second version of the database management system;
produce a catalog for an upgrade of the database, the catalog for the upgrade having tables and indices that are identical to tables and indices included in the copy of the original version of the database catalog for the second version of the database management system;
save, in the catalog for the upgrade, the copy of the original version of the database catalog for the second version of the database management system; and
cause, for information in the catalog for the upgrade, a change in references to locations of data in the database from being with respect to an organization of the database according to the first version of the database management system to being with respect to an organization of the database according to the second version of the database management system.

19. The system of claim 18, wherein:
the first processor is further configured to:
cease, in response to a completion of the change in references, an operation of the first version of the database management system by the first processor; and
start, in response to the completion of the change in references, an operation of the second version of the database management system by the first processor, the operation of the second version of the database management system by the first processor using the catalog for the upgrade as a working version of the database catalog for the second version of the database management system; and
the system further comprises a third processor, the third processor configured to:
cease, in response to the completion of the change in references, an operation of the first version of the database management system by the third processor; and
start, in response to the completion of the change in references, an operation of the second version of the database management system by the third processor.

20. The system of claim 19, wherein the first processor is located at a first site, the third processor is located at a second site, and the second site is remote from the first site.

* * * * *